(12) United States Patent
Bigott

(10) Patent No.: US 9,560,878 B2
(45) Date of Patent: Feb. 7, 2017

(54) FOOD PREPARATION ASSEMBLIES AND RELATED METHODS

(71) Applicant: Duke Manufacturing Co., St. Louis, MO (US)

(72) Inventor: James W. Bigott, Fenton, MO (US)

(73) Assignee: DUKE MANUFACTURING CO., St. Louis, MO (US)

( * ) Notice: Subject to any disclaimer, the term of this patent is extended or adjusted under 35 U.S.C. 154(b) by 254 days.

(21) Appl. No.: 14/268,710

(22) Filed: May 2, 2014

(65) Prior Publication Data

US 2014/0238451 A1    Aug. 28, 2014

Related U.S. Application Data

(62) Division of application No. 12/579,243, filed on Oct. 14, 2009, now Pat. No. 8,715,426.

(60) Provisional application No. 61/105,422, filed on Oct. 14, 2008.

(51) Int. Cl.
*B08B 3/00* (2006.01)
*A23N 12/02* (2006.01)

(52) U.S. Cl.
CPC *A23N 12/02* (2013.01); *A23L 5/57* (2016.08)

(58) Field of Classification Search
None
See application file for complete search history.

(56) References Cited

U.S. PATENT DOCUMENTS

| 2,322,417 A | 6/1943 | Christian |
| 2,531,463 A | 11/1950 | Pryor et al. |
| 3,909,291 A | 9/1975 | Leong |
| 4,197,016 A | 4/1980 | Winterhalter et al. |
| 4,236,541 A | 12/1980 | Cipriani |
| 4,329,850 A | 5/1982 | Drummond |

(Continued)

FOREIGN PATENT DOCUMENTS

| AU | 2002335694 | 3/2003 |
| CN | 1820661 | 8/2006 |

(Continued)

OTHER PUBLICATIONS http://www.youtube.com/watch?v=ScZfLvdJDJo&feature=related, dated Jul. 24, 2008.

(Continued)

*Primary Examiner* — Eric Golightly
(74) *Attorney, Agent, or Firm* — Harness, Dickey & Pierce, P.L.C.

(57) ABSTRACT

A food preparation assembly for use in cleaning food products generally includes a tank for holding washing fluid for use in cleaning food products positioned within the tank, and a pump in fluidic communication with the tank to provide movement of the washing fluid within the tank for use in cleaning the food products when positioned within the tank. A processing module is configured to receive settings from a user for cleaning the food products, and to monitor and adjust, as necessary, parameters of the washing fluid based on the user input settings. The processing module is also configured to report and/or store measured values of the parameters of the washing fluid in addition to select user defined input information (e.g., user defined wash settings, etc.). Labels may also be generated indicative of completion of cleaning of the food products by the food preparation assembly.

20 Claims, 18 Drawing Sheets

(56) References Cited

U.S. PATENT DOCUMENTS

| | | |
|---|---|---|
| 4,443,111 A | 4/1984 | Minaire |
| 4,744,379 A | 5/1988 | Goettel |
| 5,113,881 A | 5/1992 | Lin et al. |
| 5,253,380 A | 10/1993 | Lim et al. |
| 5,377,492 A | 1/1995 | Robertson et al. |
| 5,437,731 A | 8/1995 | St. Martin |
| 5,720,905 A | 2/1998 | Ho |
| 5,820,694 A | 10/1998 | St. Martin |
| 5,879,471 A | 3/1999 | St. Martin |
| 6,212,600 B1 | 4/2001 | Friedman et al. |
| 6,296,744 B1 | 10/2001 | Djeiranishvili et al. |
| 6,397,622 B1 | 6/2002 | Miller et al. |
| 6,432,892 B2 | 8/2002 | Meine et al. |
| 6,609,259 B2 | 8/2003 | Cantrell |
| 6,632,347 B1 | 10/2003 | Buckley et al. |
| 6,640,818 B1 | 11/2003 | Talisman |
| 6,659,114 B2 | 12/2003 | Bigott |
| 6,739,348 B2 | 5/2004 | Inch et al. |
| 6,871,654 B1 | 3/2005 | Berke et al. |
| 6,976,496 B2 | 12/2005 | Cantrell et al. |
| 7,021,321 B2 | 4/2006 | Bigott |
| 7,162,788 B2 | 1/2007 | Inch et al. |
| 7,246,624 B2 | 7/2007 | Cantrell et al. |
| 7,275,551 B2 | 10/2007 | Kanaya et al. |
| 7,475,698 B2 | 1/2009 | Bigott |
| 7,523,757 B2 | 4/2009 | Cantrell et al. |
| 7,527,062 B2 | 5/2009 | Bigott |
| 7,578,305 B2 | 8/2009 | Bigott |
| 7,763,119 B2 | 7/2010 | Bigott |
| 8,715,426 B2 | 5/2014 | Bigott |
| 2003/0056660 A1 | 3/2003 | Taylor et al. |
| 2004/0211731 A1 | 10/2004 | Ferguson et al. |
| 2007/0157957 A1 | 7/2007 | Lee et al. |
| 2009/0090680 A1 | 4/2009 | Bigott |
| 2009/0266383 A1 | 10/2009 | Wang |
| 2010/0282281 A1 | 11/2010 | Bigott |

FOREIGN PATENT DOCUMENTS

| | | |
|---|---|---|
| CN | 2884201 | 3/2007 |
| DE | 19712824 | 10/1998 |
| JP | 02-023994 | 1/1990 |
| JP | 11-215974 | 8/1999 |
| JP | 2000-041643 | 2/2000 |
| JP | 2005-102534 | 4/2005 |
| JP | 2005-185144 | 7/2005 |
| KR | 0284399 | 10/2002 |
| WO | WO-2006/115929 | 11/2006 |
| WO | WO-2010/045362 | 4/2010 |

OTHER PUBLICATIONS http://www.youtube.com/watch?v=6eEUazhCZyM, dated Jun. 10, 2008.

http://www.youtube.com/watch?v=i3TScSUUt8E, dated May 29, 2008.

http://www.meiko.info/Produkte,45,42,en,Automatic_lettuce_and_vegetable_washing_machine#top, accessed Oct. 14, 2009.

http://www.tryfit.com/, accessed Oct. 14, 2009.

Power Soak, Power Soak Systems, Inc., Produce Soak Specifications, 2 pages, (33542—Apr. 23, 2010).

Produce Soak flyer pages, From Potatoes to Tomatoes . . . An Easier Way to Wash & Sanitize Produce, Introducing the Innovative Produce Soak, 2 pages.

Third-party correspondence submitted under 37 CFR §1.99 in U.S. Appl. No. 12/579,243, including third-party letter dated Aug. 10, 2010 and attachments, 24 pages.

|  | Number of Water Changes: 6<br>PH Level: Low: 2.8 High: 3.4 Average: 3.1<br>Water Temp: Low: 40 High: 46 Average: 43<br>Number of Processes: 18 | | | | | |
|---|---|---|---|---|---|---|
| Date | Time | Basket | °F | PH Level | Process | Soak (m:s) |
| 1 | 2:30 PM | 1 | 45 | 3.0 | FRUITS | 2:0 |
| 2 | 3:28 PM | 2 | 44 | 3.1 | GREENS LEAFY | 3:0 |
| 3 | 3:45 PM | 3 | 43 | 2.9 | ROOTED | 8:0 |
| 4 | 7:00 AM | 1 | 42 | 3.3 | FRUITS | 2:0 |
| 5 | 7:28 AM | 1 | 44 | 3.1 | FRUITS | 2:0 |
| 6 | 8:31 AM | 2 | 43 | 3.1 | MELONS | 4:0 |
| 7 | 9:04 AM | 3 | 45 | 2.8 | MELONS | 8:0 |
| 8 | 2:28 PM | 1 | 42 | 2.9 | GREENS LEAFY | 3:0 |
| 9 | 2:45 PM | 2 | 44 | 2.8 | ROOTED | 8:0 |
| 10 | 3:15 PM | 3 | 40 | 3.1 | MELONS | 4:0 |
| 11 | 8:28 AM | 2 | 43 | 3.0 | FRUITS | 2:0 |
| 12 | 9:17 AM | 1 | 40 | 2.9 | FRUITS | 2:0 |
| 13 | 10:07 AM | 2 | 42 | 3.2 | GREENS LEAFY | 3:0 |
| 14 | 11:12 AM | 3 | 46 | 3.0 | GREENS LEAFY | 3:0 |
| 15 | 1:05 PM | 2 | 45 | 3.4 | ROOTED | 8:0 |
| 16 | 1:21 PM | 1 | 43 | 3.2 | FRUITS | 2:0 |
| 17 | 6:15 AM | 2 | 45 | 3.4 | FRUITS | 2:0 |
| 18 | 7:15 AM | 1 | 42 | 3.1 | FRUITS | 2:0 |

Fig. 18

FOOD PREPARATION ASSEMBLIES AND RELATED METHODS

CROSS-REFERENCE TO RELATED APPLICATION

This application is a divisional application of U.S. patent application Ser. No. 12/579,243, filed Oct. 14, 2009, and issued as U.S. Pat. No. 8,715,426 on May 6,2014 which claims priority to and the benefit of U.S. Provisional Application No. 61/105,422, filed on Oct. 14, 2008. The entire disclosures of the above applications are incorporated herein by reference.

FIELD

The present disclosure relates generally to food preparation assemblies and methods related to preparing food products. More particularly, the present disclosure relates to food preparation assemblies for cleaning food products, including, but not limited to, fruits, vegetables, meats, etc., and methods related thereto.

BACKGROUND

This section provides background information related to the present disclosure which is not necessarily prior art.

Food contamination, food poisoning, and food-borne illnesses caused, for example, by microorganisms (e.g., bacteria such as *Campylobacter jejuni, E-coli, Salmonella, Staphylococcus aureus*, etc.), pesticides, etc. are increasing public concerns. There is increasing public awareness of the cumulative health damage caused by the practically unavoidable regular consumption of minute residues of toxic pesticides, herbicides and fungicides, as well as microbiological contaminants. In the United States, the Center for Disease Control (CDC) estimates that each year about 70 million people get sick from food poisoning, more than 325,000 people are hospitalized from food poisoning, and about 5,000 die from food borne-illnesses. And recently, the supply chain for fresh produce has been scrutinized following a number of illnesses and deaths caused by produce-sourced food-borne illnesses.

SUMMARY

This section provides a general summary of the disclosure, and is not a comprehensive disclosure of its full scope or all of its features.

Example embodiments of the present disclosure are generally directed toward methods for consistently cleaning batches of food products for distribution and/or consumption. In one example embodiment, a method generally includes positioning a batch of food products at least partially within washing fluid in a tank, agitating the washing fluid in the tank, automatically measuring a value of at least one or more parameters of the washing fluid, adjusting the at least one or more parameters of the washing fluid to desired values as necessary as determined by a processing module based at least partially on the measured value of the at least one or more parameters of the washing fluid, and removing the batch of food products from the washing fluid in the tank after a desired length of time.

Example embodiments of the present disclosure are generally directed toward methods for preparing at least one food product for distribution and/or consumption and providing quality assurance that the at least one food product has been cleaned. In one example embodiment, a method generally includes filling a tank with washing fluid for cleaning at least one food product, selecting a wash cycle pertaining to at least one type of food product to be cleaned where the wash cycle defines a cleaning time for cleaning the at least one type of food product, positioning the at least one food product in the washing fluid in the tank and agitating the washing fluid in the tank, and automatically measuring pH and/or conductivity of the washing fluid, automatically adjusting the pH and/or conductivity of the washing fluid as desired by adding a wash agent to the washing fluid as determined by a processing module based at least partially on the measured pH and/or conductivity of the washing fluid.

Example embodiments of the present disclosure are generally directed toward food preparation assemblies for consistently cleaning batches of food products. In one example embodiment, a food preparation assembly generally includes a tank for holding washing fluid for use in cleaning a batch of food products positioned within the tank, a pump in fluidic communication with the tank to provide movement of the washing fluid within the tank for use in cleaning the batch of food products when positioned within the tank, and a processing module. The processing module is configured to receive at least one setting from a user for cleaning the batch of food products, and to report a measured value of at least one or more parameters of the washing fluid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 18 is an example report that may be generated based on data and/or statistics of usage, functions, operation, etc. of the method of FIG. 13.

Corresponding reference indicators indicate corresponding parts throughout the several views of the drawings.

DETAILED DESCRIPTION

Figure 1:
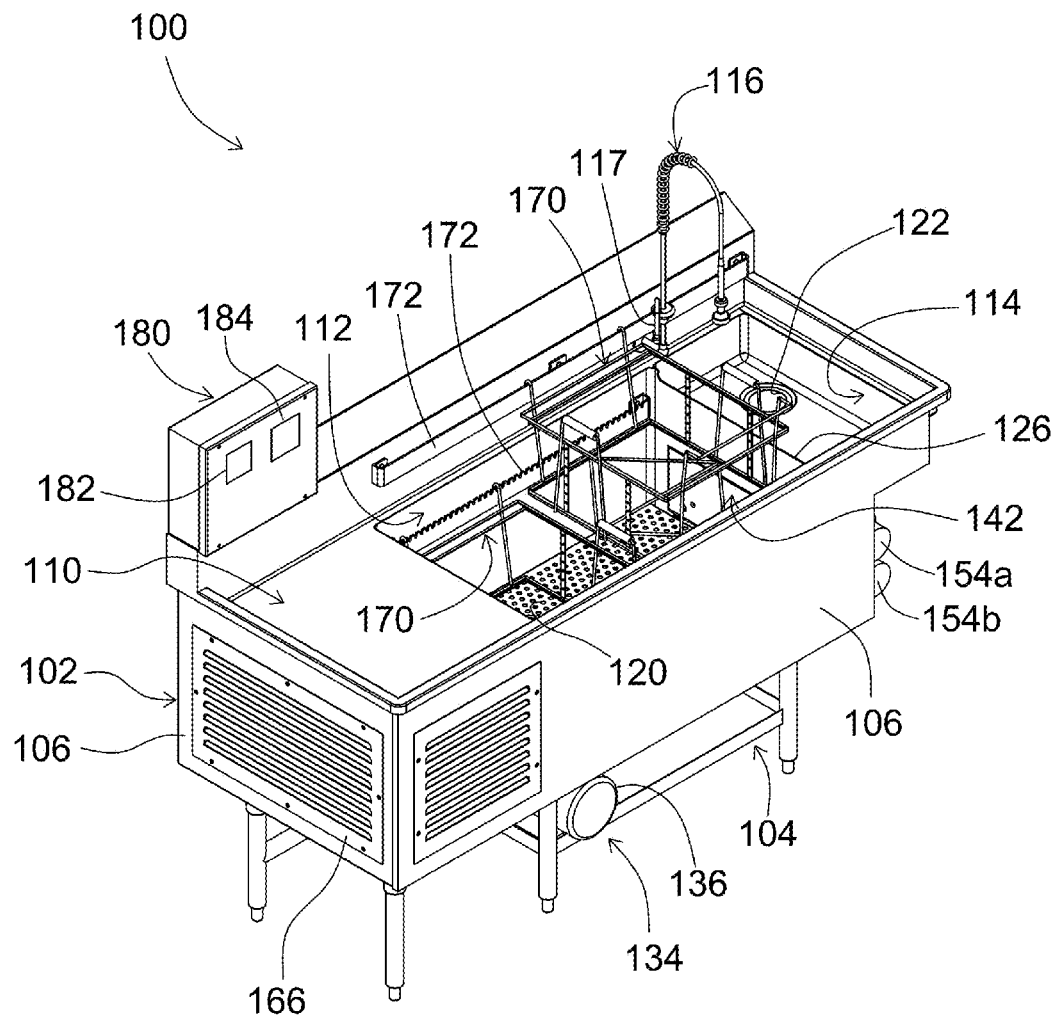
FIG. 1 is a forward perspective view of an example embodiment of a food preparation assembly including one or more features of the present disclosure.
Figure 2:
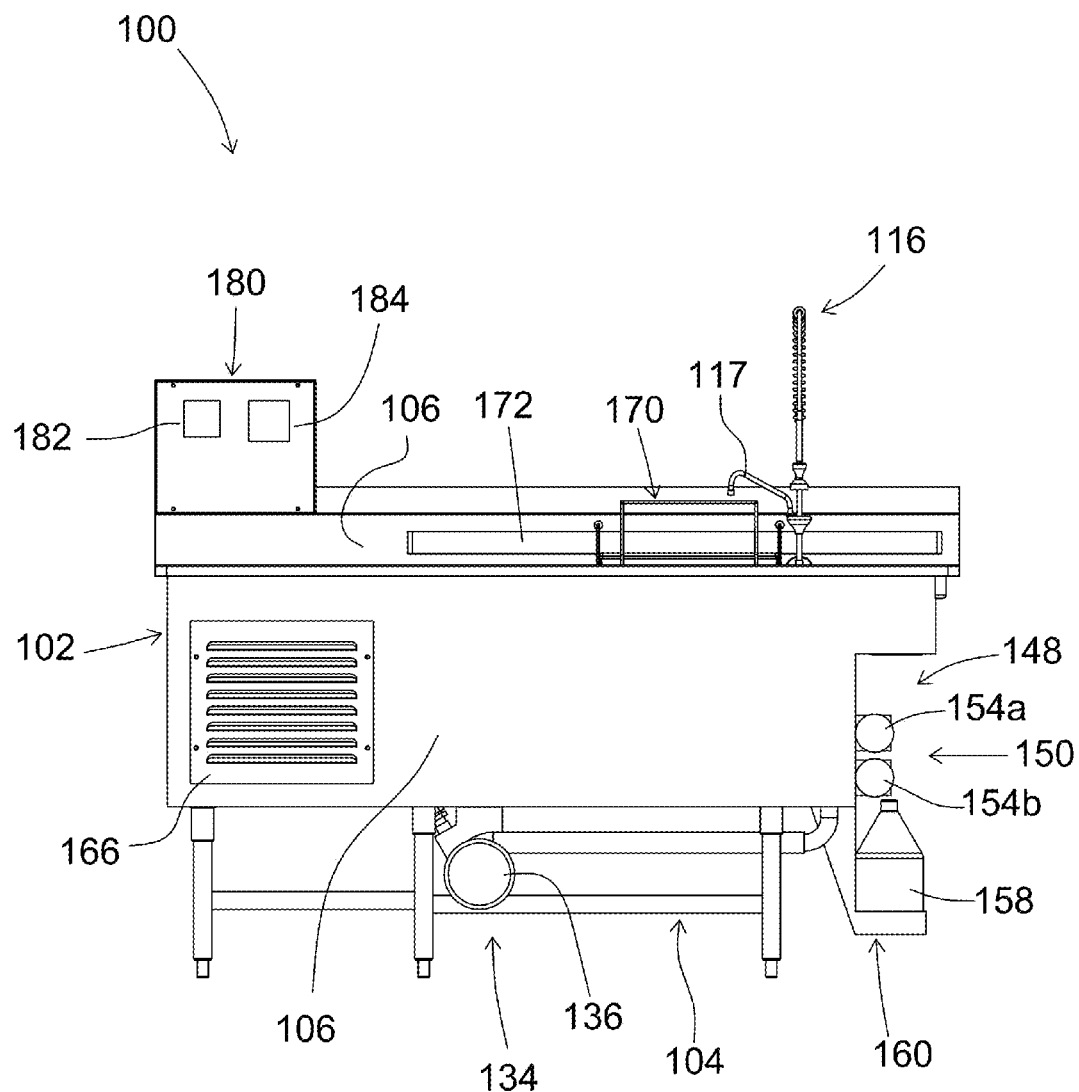
FIG. 2 is a forward elevation view of the food preparation assembly of FIG. 1.
Figure 3:
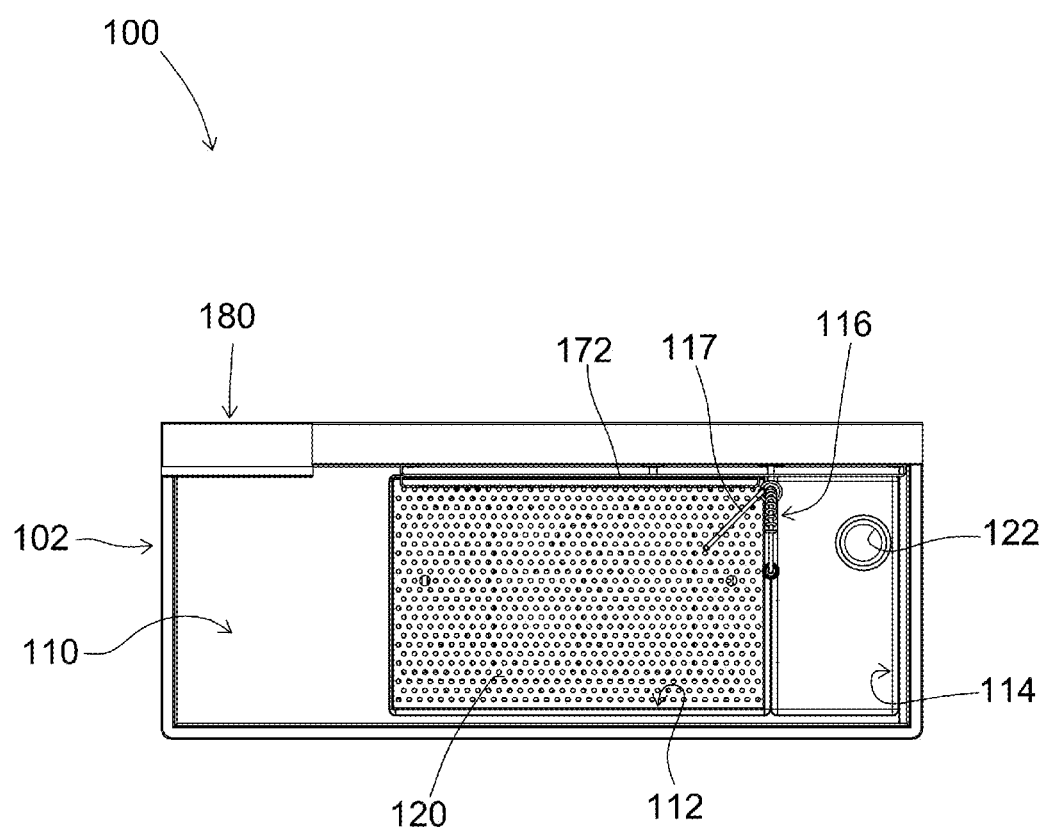
FIG. 3 is a top plan view of the food preparation assembly of FIG. 1, with baskets removed from the assembly.
Figure 4:
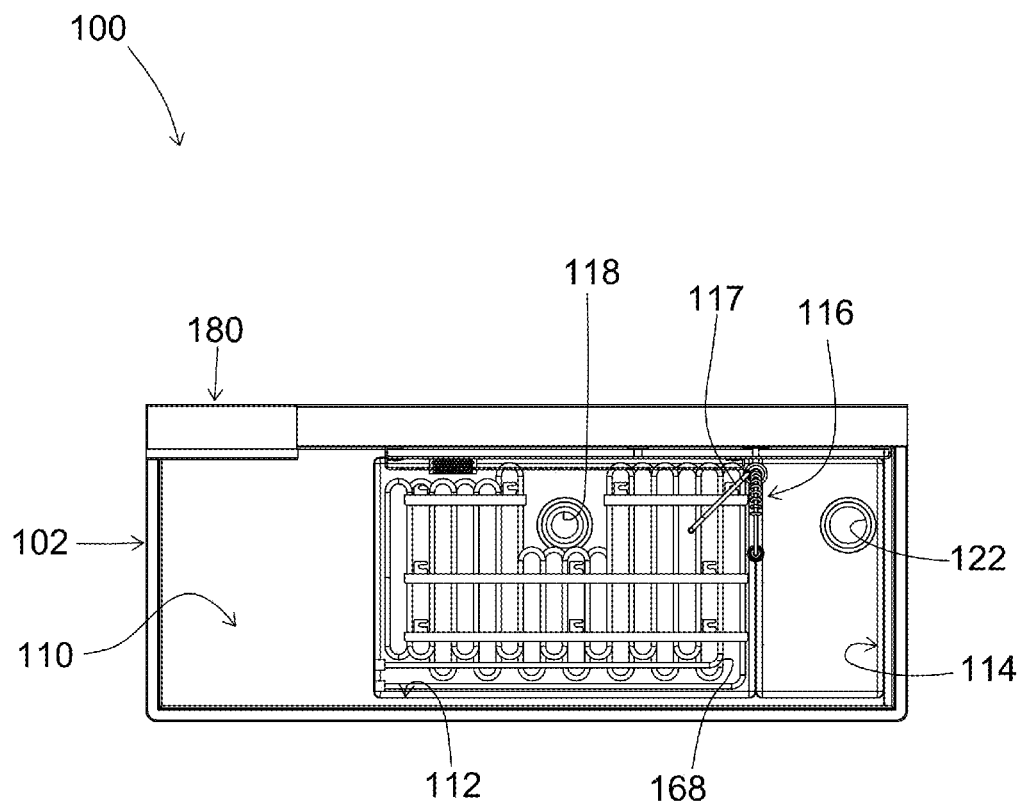
FIG. 4 is a top plan view of the food preparation assembly similar to that of FIG. 3, with a false bottom removed from a washing chamber of the assembly.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-8 illustrate an example embodiment of a food preparation assembly 100 including one or more aspects of the present disclosure. The food preparation assembly 100 is configured for use, for example, to clean food products, to monitor such cleaning operations, and/or to label the cleaned food products, for example, as part of a quality assurance program, etc. indicating that the food products have been cleaned. The example embodiment may include innovative food product washing equipment and may provide procedures designed to help monitor and assure compliance with established food safety programs.

As shown in FIGS. 1-4, the illustrated food preparation assembly 100 generally includes a tank 102 having a generally rectangular shape and mounted generally over a support platform 104. The tank 102 may be insulated with, for example, foam, etc. For example, walls 106 of the tank 102 can each generally include two panels spaced apart and including insulation therebetween (such that the tank 102 is generally insulated) to help inhibit heat transfer through the walls 106 as well as the formation of condensation on outsides of the tank's walls 106 caused, for example, by temperature differences of fluid within the tank 102 and ambient air around the tank 102. Alternative embodiments can include tanks and/or support platforms having different shapes including, for example, cylindrical shapes, cubic shapes, triangular shapes, trapezoidal shapes, circular shapes, ovular shapes, prismatic shapes, etc.

The illustrated tank 102 generally defines a drain board 110, a washing chamber 112, and a final rinsing chamber 114. The drain board 110 is configured (e.g., sized, shaped, constructed, etc.) for use to initially prepare the food products (e.g., rinse dirt, loose food particles, etc. from the food products, chop, trim, cut the food products, etc.). The washing chamber 112 is configured for holding washing fluid for use in cleaning the food products. And, the final rinsing chamber 114 is configured for rinsing the food products after they are washed and/or for receiving overflow washing fluid from the washing chamber 112.

In other example embodiments, food preparation assemblies may include tanks with different combinations of, for example, drain boards, washing chambers, and/or final rinsing chambers than disclosed herein. For example, in one example embodiment a food preparation assembly includes a tank having a washing chamber and a final rinsing chamber with no drain board. In still other example embodiments, food preparation assemblies may include tanks having one or more features other than, or in addition to, a drain board, a washing chamber, and a final rinsing chamber. For example, in one example embodiment a food preparation assembly includes a tank having a pre-rinsing chamber, a washing chamber, and final rinsing chamber. In this embodiment, the pre-rinsing chamber is configured for use to initially rinse the food products (e.g., rinse dirt, loose food particles, etc. from the food products, etc.).

A spraying fixture 116 is mounted to a rearward wall of the tank 102, for example, generally above (or between, etc.) the drain board 110, the washing chamber 112, and/or the final rinsing chamber 114. Alternatively, the spraying fixture 116 can be located above the food preparation assembly 100 (and thus above the tank 102 of the food preparation assembly 100) generally above the drain board 110, the washing chamber 112, and/or the final rinsing chamber 114. The spraying fixture 116 operates to provide fluid (e.g., water, etc.) as desired to each of the drain board 110, washing chamber 112, and final rinsing chamber 114 for use in washing, rinsing, etc. the food products, surfaces of the drain board 110, surfaces of the chambers 112 and 114, etc.

A discharge faucet 117 is mounted to a rearward wall of the tank 102 (e.g., in connection with the spraying fixture 116, etc.), for example, generally above the final rinsing chamber 114 for use in providing fluid (e.g., water, etc.), for example, to the washing chamber 112 for filling the washing chamber 112, etc. The discharge faucet may be formed as a single unit with the spraying fixture 116 within the scope of the present disclosure. In some example embodiments, food preparation assemblies may further include reel spray hoses coupled to tanks and/or to wash agent containers for use in spraying, decontaminating, etc. surfaces of chambers of the tanks, other surfaces of the tanks, etc.

In the illustrated embodiment, the washing chamber 112 is disposed generally between the drain board 110 and the final rinsing chamber 114. And in operation of the illustrated food preparation assembly 100 (which will be described in more detail hereinafter), the food products can be initially prepared at the drain board 110 (e.g., to remove loose soil, loose food particles, etc. that may interfere with, hinder, etc. further cleaning, etc.). The prepared food products can then be positioned in the washing chamber 112 for cleaning, and then moved to the final rinsing chamber 114 for rinsing and/or subsequent processing. In other example embodiments, food preparation assemblies may include drain boards, washing chambers, and/or final rinsing chambers oriented differently than disclosed herein and/or may include features other than drain boards, washing chambers, and/or final rinsing chambers. For example, in one example embodiment, a food preparation assembly includes a pre-rinsing chamber, a washing chamber, and a final rinsing chamber. In this embodiment, the washing chamber may be disposed generally between the pre-rinsing chamber and the final rinsing chamber. In another example embodiment, a food preparation assembly includes a washing chamber and a rinsing chamber. In this embodiment, the washing chamber may be disposed generally adjacent the rinsing chamber.

As previously stated, the washing chamber 112 is configured to hold the washing fluid for use in cleaning the food products. A drain 118 (FIG. 4) is provided in a bottom portion of the washing chamber 112, generally under a false bottom 120 removably disposed within the washing chamber 112 (FIG. 1), for removing washing fluid from the washing chamber 112 as desired. A filter system (not shown) may be located in connection with the drain 118 or elsewhere as desired. Any suitable type of filter system may be used within the scope of the present disclosure. In addition, the washing fluid may include any suitable washing fluid such as, for example, water, etc. And, a suitable wash agent (e.g., antimicrobial wash agent, FIT fruit and vegetable wash agent, grapefruit extract-based wash agent, grapefruit oil-based wash agent, etc.), chemical, etc. may be included in, added to, etc. the washing fluid to help with, enhance, etc. cleaning of the food products. Other wash agent examples are provided hereinafter.

The final rinsing chamber 114 is configured for use in rinsing the food products after they are cleaned in the washing chamber 112. For example, the final rinsing chamber 114 is configured to retain the cleaned food products, hold fluid for use in rinsing the cleaned food products, catch fluid used to rinse the cleaned food products, retain loose food particles, etc. that may be rinsed from the cleaned food products, etc. A drain 122 is provided in a bottom portion of the final rinsing chamber 114 for removing rinsing fluid from the final rinsing chamber 114 as desired. A filter system (not shown) may be located in connection with the drain 122 or elsewhere as desired. Any suitable type of filter system may be used within the scope of the present disclosure. The illustrated final rinsing chamber 114 also includes a weir structure 126 (e.g., a cutout, a lowered section, etc.) (FIG. 1) to allow washing fluid from the washing chamber 112 to overflow to the final rinsing chamber 114 for collection in the final rinsing chamber 114 and/or removal through the final rinsing chamber's drain 122 as necessary. A cutting board or other movable, detachable, etc. work surface (not shown) may be positioned over the final rinsing chamber 114 (and/or over the drain board 110 and/or over the washing chamber 112), for providing a food product preparation surface, a cutting surface, etc. as desired within the scope of the present disclosure.

Sensors (not shown) may be provided in the food preparation assembly 100 for measuring different parameters of the washing fluid. The sensors may be positioned in fluidic communication with the washing fluid (e.g., at least partially within the washing chamber 112, etc.) for measuring the different parameters of the washing fluid. Parameters of the washing fluid to be measured may include washing fluid level in the tank 102, pH, conductivity, washing fluid concentration, wash agent concentration, temperature, etc. And, the sensors may include, but are not limited to, float switches, pH probes, oxidation reduction potential (ORP) probes, conductivity probes, thermometers, thermostats, thermocouples, etc. The sensors may activate alarms, lighted signals, etc. if measured values of the parameters of the washing fluid move away from predetermined, desired, etc. values or range of values.

Figure 5:
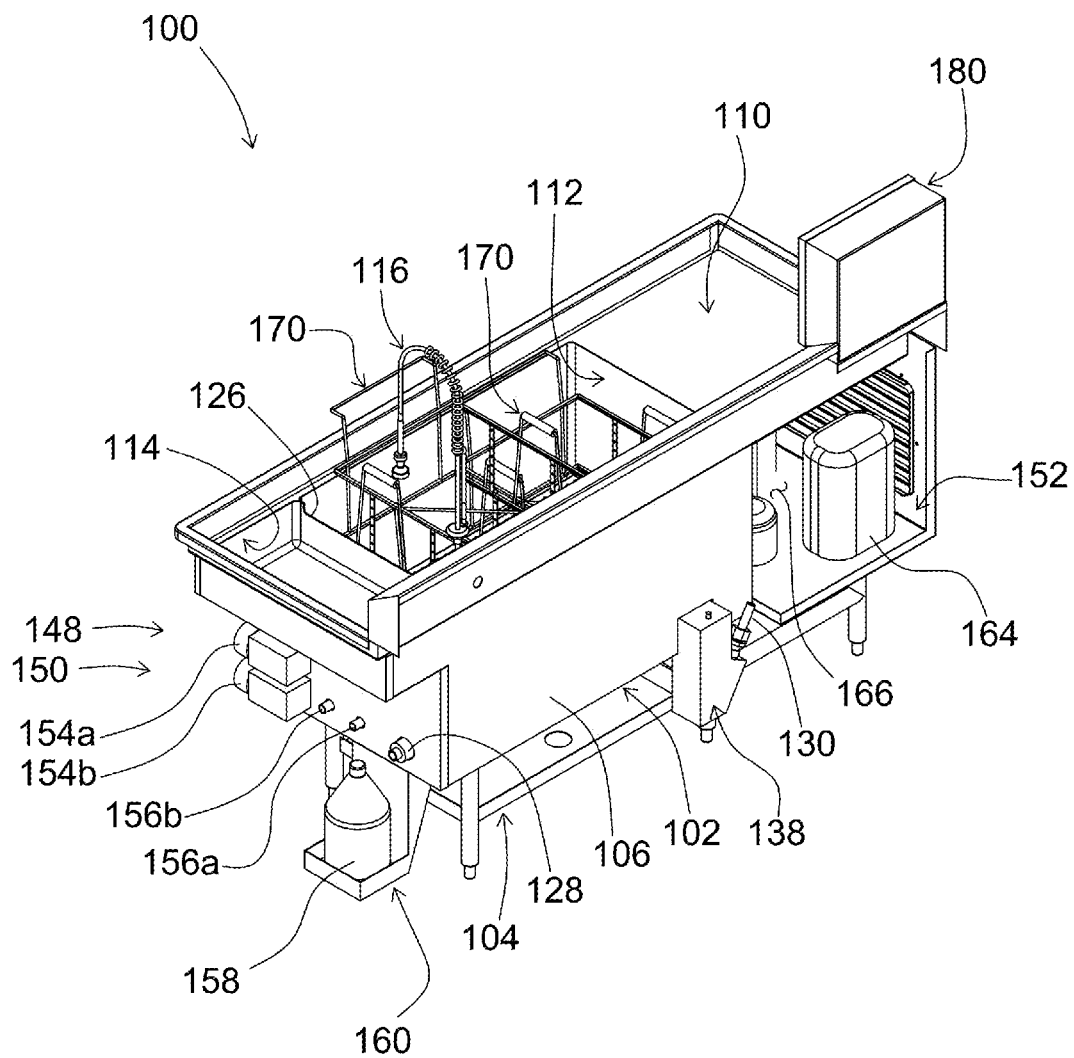
FIG. 5 is a rearward perspective view of the food preparation assembly of FIG. 1.

As shown in FIG. 5, in the illustrated embodiment, for example, a float switch 128 is provided for measuring fluid level of the washing fluid in the washing chamber 112 and a pH probe 130 is provided for measuring pH of the washing fluid. A thermocouple (or thermometer, not visible) is also provided for measuring temperature of the washing fluid. In other example embodiments, a float switch, a pH probe, and/or a thermocouple (or other temperature sensor) may be included as a single sensor positioned in fluidic communication with the washing fluid (e.g., at least partially within a washing chamber, etc.). At least one or more other sensors may be provided for measuring at least one or more different parameters than disclosed herein within the scope of the present disclosure. And, as will be described in more detail hereinafter, such measured parameters may be used to adjust the values of the measured parameters, for example, of the washing fluid, etc. as desired.

Figure 6:
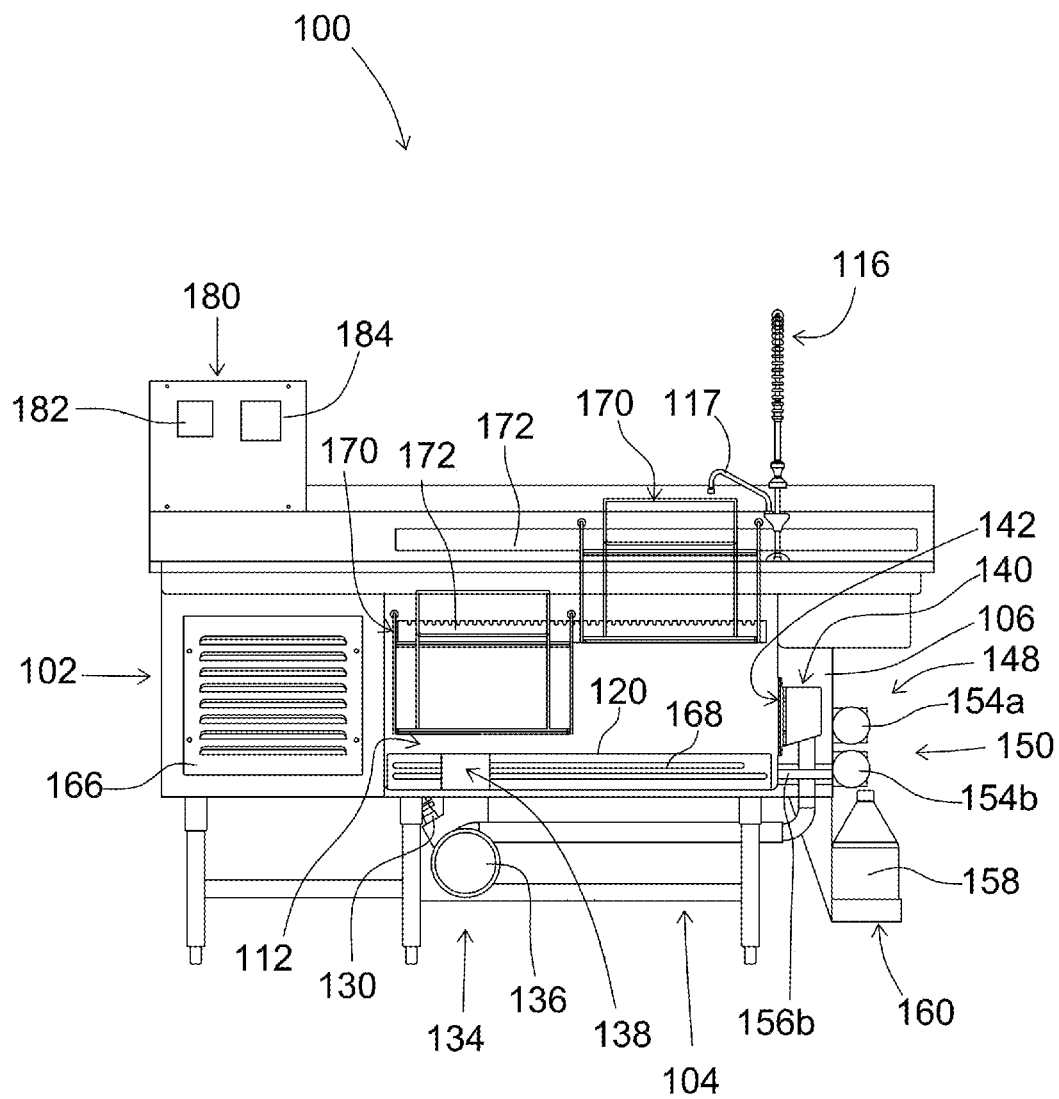
FIG. 6 is a forward perspective view of the food preparation assembly of FIG. 1, with part of a tank removed to show internal construction of the assembly.
Figure 7:
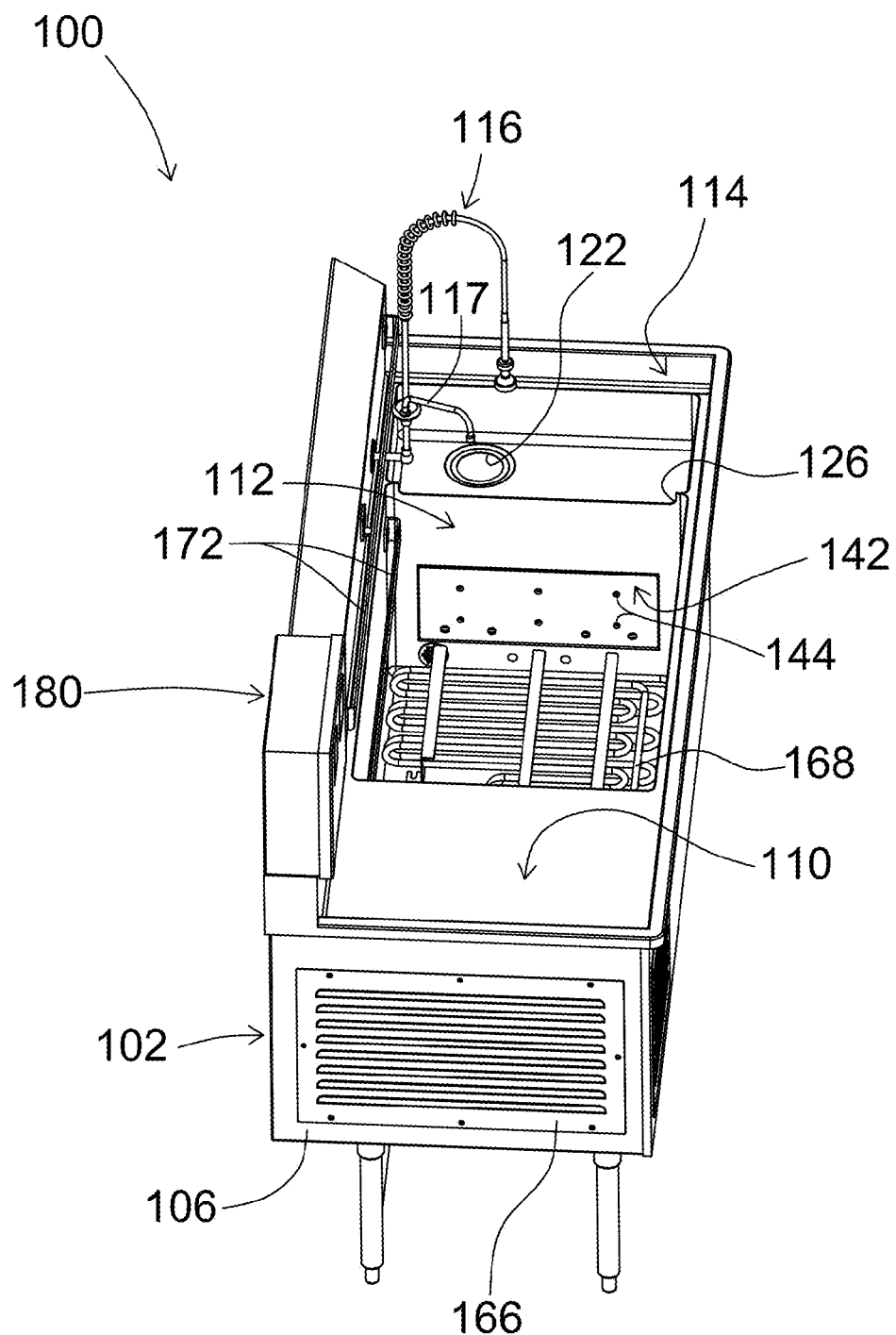
FIG. 7 is an end elevation view of the food preparation assembly of FIG. 1, with the false bottom removed from the washing chamber of the assembly.
Figure 8:
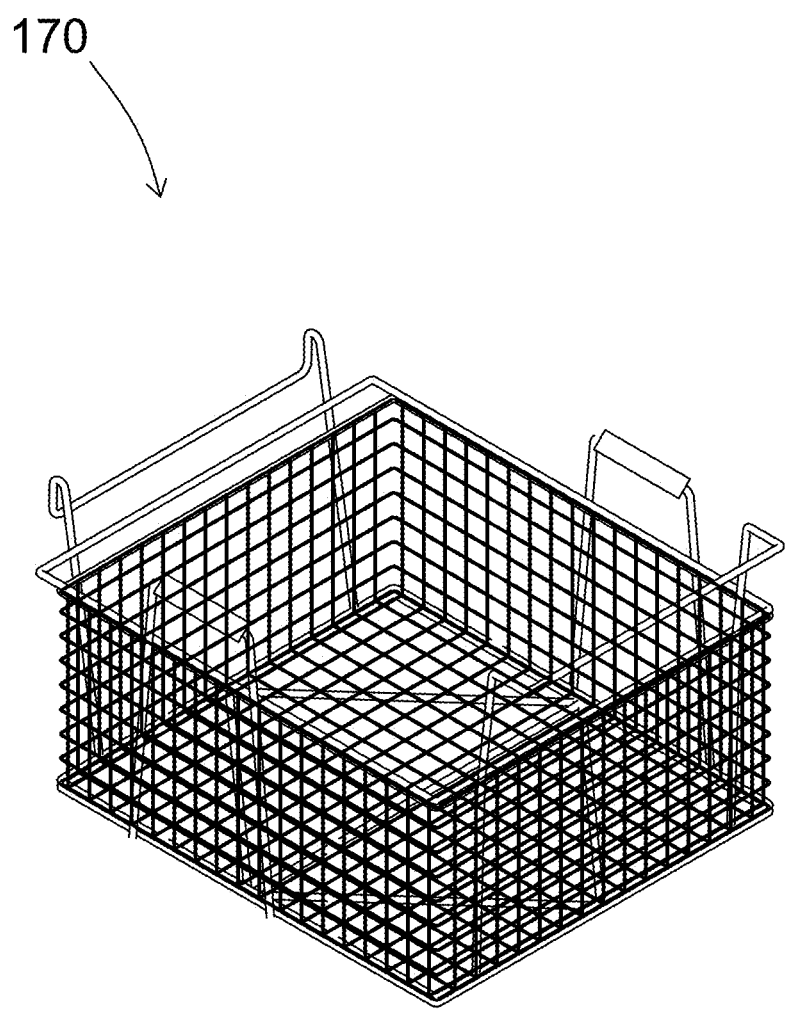
FIG. 8 is a perspective view of a basket of the food preparation assembly of FIG. 1.

With reference now to FIGS. 6 and 7, the illustrated food preparation assembly 100 includes a fluid circulation system 134 disposed generally in fluidic communication with the washing chamber 112 of the food preparation assembly 100. The fluid circulation system 134 recirculates washing fluid within the washing chamber 112. The recirculating operation of the fluid circulation system 134 moves, agitates, provides turbulence to, mixes, etc. the washing fluid in the washing chamber 112 for mixing the wash agent with the washing fluid in the washing chamber 112, for helping clean the food products in the washing chamber 112 (e.g., for creating surface friction between the washing fluid and the food products in the washing chamber 112, for improving scrubbing action of the washing fluid on the food products, etc.), etc.

The illustrated fluid circulation system 134 generally includes a pump 136 supported by the support platform 104 of the food preparation assembly 100 (e.g., generally under the tank 102 of the food preparation assembly 100, etc.), an intake 138 positioned generally in the rearward wall portion (or alternatively, in a lower wall portion) of the washing chamber 112, and a discharge manifold 140 generally defined in a side wall portion of the washing chamber 112. In the illustrated embodiment, the intake 138 is positioned within a well spacing generally defined within the bottom portion of the washing chamber 112, for example, generally below the perforated false bottom 120 (see, also, FIG. 1). A perforated cap may be disposed generally over the intake 138, for example, to help inhibit ingress of food particles, etc. through the intake 138 to the pump 136. And, a cover plate 142 (FIG. 7) is disposed generally over the discharge manifold 140 to discharge washing fluid into the washing chamber 112 through openings 144 in the cover plate 142. The openings 144 in the cover plate 142 are configured (e.g., sized, shaped, positioned, etc.) to provide desired discharge of washing fluid into the washing chamber 112. The configuration of the openings 144 may be altered as desired to adjust flow patterns, pressures, etc. of the washing fluid being discharged into the washing chamber 112 within the scope of the present disclosure. Alternatively, the cover plate 142 may be substituted with other cover plates as desired (e.g., having different opening configurations, etc.) to adjust flow patterns, pressures, etc. of the washing fluid being discharged into the washing chamber 112.

In operation of the fluid circulation system 134, the pump 136 operates to draw, remove, etc. washing fluid from the washing chamber 112 through the intake 138 and into fluid conduit leading to the pump 136. The pump 136 then directs the washing fluid through fluid conduit leading to the discharge manifold 140 for discharge back into the washing chamber 112 (through the cover plate 142). As such, the intake 138 and the discharge manifold 140 are generally in fluidic communication with the pump 136. The cover plate 142 of the discharge manifold 140 allows fluid to generally build up in the discharge manifold 140 behind the cover plate 142 such that it can be discharged into the washing chamber 112 under pressure through the openings 144 in the cover plate 142. The pressurized discharge provides turbulence in the washing chamber 112 for agitating, mixing, etc. the washing fluid in the washing chamber 112. It should be understood that any suitable pump may be used for operation with the first fluid circulation system 134 within the scope of the present disclosure. For example, pumps operable at about 100 gallons per minute, more than 100 gallons per minute, less than 100 gallons per minute, etc. may be used. In addition, pumps operable at variable speeds, for example, to alter recirculation rates, etc. and thereby alter cleaning operation of food products within the washing chamber 112, may be used.

As previously stated, filter systems may be included within or in connection with one or more of the washing chamber 112, the final rinsing chamber 114, etc. of the illustrated food preparation assembly 100. The filter systems may, for example, assist in reducing presence of food particles, debris, other contaminants, etc. within the chambers 112 and 114 and/or within waste fluid from the food preparation assembly 100. Any suitable type of filter system may be used within the scope of the present disclosure.

With additional reference again to FIG. 5, the illustrated food preparation assembly 100 also includes systems, devices, etc. for controlling, adjusting, etc. the different parameters (e.g., the pH, the conductivity, the temperature, foaming characteristics, etc.) of the washing fluid. For example, the illustrated assembly 100 includes two injection devices 148 and 150 located adjacent the washing chamber 112 for use in controlling, adjusting, etc. the pH, conductivity, etc. of the washing fluid and/or foaming of the washing fluid, and a cooling device 152 for controlling, adjusting, etc. the temperature of the washing fluid. The injection devices 148 and 150 and the cooling device 152 may be in communication with the sensors to help determine when their operation is necessary. Such operation may be automated, as will be described further hereinafter. However, manual operation of the injection devices 148 and/or 150 and/or the cooling device 152, as desired, could also be available. The food preparation assembly 100 may include at least one or more different and/or additional systems, devices, etc. for controlling, adjusting, etc. pH, conductivity, and/or foaming and/or temperature of the washing fluid, and/or may include at least one or more additional systems, devices, etc. for controlling, adjusting, etc. other parameters of the washing fluid within the scope of the present disclosure.

As shown in FIGS. 5 and 6, the two illustrated injection devices 148 and 150 are disposed generally under the final rinsing chamber 114. Each of the injection devices 148 and 150 generally includes a pump 154a and 154b and a discharge 156a and 156b positioned in a side wall portion of the tank 102 and washing chamber 112. Conduit may extend from a wash agent container 158 (supported by a shelf 160) to pump 154a, and from the pump 154a to discharge 156a. Similarly, conduit may extend from an antifoaming agent container (not shown) to pump 154b, and from the pump 154b to the discharge 156b. A perforated cover may be positioned over each of the discharges 156 to help inhibit ingress of food particles, etc. through the discharges 156 to the pumps 154. It should be understood that any suitable pumps may be used for operation with the injection devices within the scope of the present disclosure. For example, peristaltic pumps, etc. may be used. In addition, pumps operable at variable speeds may be used.

In operation of a first injection device 148, the pump 154a activates when, for example, the pH, conductivity, etc. of the washing fluid, the pH, conductivity, etc. of the wash agent, chemical, etc. concentration, other indicator (e.g., other measure of acid content, base concentration, etc.), etc. of the washing fluid and or wash agent moves away from a predetermined, desired, etc. value and/or moves out of a predetermined, desired, etc. range (e.g., as measured by the pH probe 130, other sensor, etc. (not shown), etc.).

For example, in the illustrated embodiment the pump 154a may activate when the pH, conductivity, etc. of the washing fluid rises above about 3.4. The activated pump 154a then operates to draw, remove, etc. wash agent from the wash agent container 158, and directs the wash agent to the discharge 156a for discharge into the washing chamber 112. As such, the wash agent container 158 and the discharge 156a are in fluidic communication with the pump 154a. And the wash agent discharged into the washing chamber 112 operates to lower the pH, conductivity, etc. of the washing fluid in the washing chamber 112 back to the predetermined, desired, etc. value of about 3.4 or acceptable range of values (at which time operation of the pump 154a and injection device 148 ceases until further operation is required). In other example embodiments, wash agents may be added to raise a measured pH, conductivity, etc. of washing fluids.

In operation of a second injection device 150, the pump 154b activates (e.g., automatically, etc.) at predetermined, desired, etc. intervals during operation of the assembly 100 for dispensing predetermined, desired, etc. volumes of antifoaming agents (e.g., through discharge 156b, etc.), or may be, for example, activated when the antifoaming agent concentration, other indicator, etc. of the washing fluid and/or antifoaming agent moves away from a predetermined, desired, etc. value and/or moves out of a predetermined, desired, etc. range.

As shown in FIGS. 5, 6, and 7, the illustrated cooling device 152 generally includes a refrigeration unit 164 (e.g., condenser, etc.) disposed within a housing 166 located adjacent the washing chamber 112 and generally under the drain board 110, and an evaporator coil 168 (see, also, FIG. 4) disposed within the washing chamber 112 above the bottom portion of the washing chamber 112 (e.g., in communication with the washing chamber 112, etc.). The false bottom 120 (FIG. 1) is disposed generally over the evaporator coil 168 (and generally above the bottom portion of the washing chamber 112) to help inhibit ingress of food particles into the portion (or well spacing) of the washing chamber 112 that contains the evaporator coil 168. The refrigeration unit 164 may include any suitable unit within the scope of the present disclosure. For example, the illustrated refrigeration unit 164 may include a unit operable to circulate a liquid refrigerant (e.g., Freon, etc.) through a compressor, a condenser, an expansion valve (or throttle valve), etc. or a closed looped system may be used (e.g., glycol, brine, etc.) to conduct temperature variance to the washing fluid, creating heat absorption. In addition, any suitable evaporator coils (e.g., open tube, shell-in-tube, finned, plate, etc.) may be used within the scope of the present disclosure.

In operation of the cooling device 152, the refrigeration unit 164 activates when, for example, the temperature of the washing fluid moves away from a predetermined, desired, etc. value and/or moves out of a predetermined, desired, etc. range (as measured by the thermocouple, thermometer, etc.). For example, in the illustrated embodiment the refrigeration unit 164 may activate when the temperature of the washing fluid rises above about 45 degrees Fahrenheit. The activated refrigeration unit 164 then operates to move refrigerant from the refrigeration unit 164 to the evaporator coil 168 within the washing chamber 112 to absorb heat and thereby cool the washing fluid. The refrigerant (via the evaporator coil 168) operates to lower the temperature of the washing fluid in the washing chamber 112 back to the predetermined, desired, etc. value of about 45 degrees Fahrenheit or to a range of desired values (at which time operation of the refrigeration unit 164 and cooling device 152 ceases until further operation is required).

In other example embodiments, cooling devices may not be included as washing fluid may be provided from a sufficiently cool source. Alternatively, washing fluid may be cooled, for example, by adding chilled water, ice, introducing other cooling means, etc. within the scope of the present disclosure.

With reference again to FIG. 1, baskets 170 are provided for positioning the food products in a desired location in or above the food preparation assembly 100 (e.g., within or above the drain board 110, the washing chamber 112, the final rinsing chamber 114, etc.). An individual basket 170 is further illustrated in FIG. 8. The baskets 170 are generally fluid permeable. The baskets 170 may allow food products of differing types or of the same type to be contained in different baskets 170 and cleaned generally simultaneously by the food preparation assembly 100. The baskets 170 may also allow for easy transfer of the food products, as desired. In the illustrated embodiment, the baskets 170 are configured to mount to rails 172 located along a rearward portion of the tank 102 of the food preparation assembly 100 (and above the washing chamber 112 and final rinsing chamber 114 in the illustrated embodiment) and along a rearward portion of the washing chamber 112. The baskets 170 can mount to the rails 172 in desired positions (e.g., above the washing chamber 112, within the washing chamber 112, etc.) and can be moved along the rails 172 and/or between the rails 172 as desired. The baskets 170 may be moved as desired for preparation operations, cleaning operations, rinsing operations, drying operations, etc. The baskets 170 may also incorporate lids, covers, etc. to help inhibit loss of food products from the baskets 170.

With continued reference to FIG. 1, the illustrated food preparation assembly 100 further includes a pluggable processing module 180 operable to control operation of the assembly 100. The illustrated processing module can be coupled to the tank 102. The processing module 180 is in communication with the sensors (e.g., the float switch 128, the pH probe 130, the thermocouple, etc.), the fluid circulation system 134 (e.g., with the pump 136 thereof, etc.), the injection devices 148 and 150, and the cooling device 152 of the food preparation assembly 100. And, as such, the processing module 180 can (in an automated fashion) operate to gather and store data on operational parameters; control, adjust, monitor, record, etc. different parameters (e.g., wash agent dosages, antifoaming agent doses, washing fluid level, the pH, conductivity, the temperature, etc.) of the washing fluid in the food preparation assembly 100 through control of the fluid circulation system 134, the injection devices 148 and/or 150, and/or the cooling device 152, etc. For example, the processing module 180 can receive measurement information from the sensors regarding a parameter of the washing fluid in the washing chamber 112. If the measurement information differs from a predetermined, desired, etc. value or range of values for the parameter, the processing module 180 can activate operation of, modify operation of, etc. one or more of the fluid circulation system 134, the injection devices 148 and/or 150, and/or the cooling device 152, etc. as necessary to move the measured parameter back to the predetermined, desired, etc. value. The processing module 180 can then deactivate operation of, further modify operation of, etc. one or more of the fluid circulation system 134, the injection devices 148 and/or 150, and/or the cooling device 152, etc. as necessary. Or the processing module 180 can lockout user operation from a food safety aspect if the desired parameters are not met.

The illustrated processing module 180 is a pluggable module 180 such that the module 180 can be plugged into the food preparation assembly 100 and/or removed from the food preparation assembly 100 as a unit. In the event of a failure, the entire module 180 can be removed and replaced in its entirety by a layperson. Advantageously, this can allow for the elimination of costly service calls by a technician, for example, to perform diagnostics in the field to determine which individual component failed, and downtime of the machine while waiting for that service to be performed.

The illustrated processing module 180, as an example, includes a user interface 182, a control network, and a printing device 184. The user interface 182 includes a graphical user interface 182 (e.g., a touchpad, etc.) configured to receive at least one user input related to cleaning food products. For example, the illustrated graphical user interface 182 is configured to receive a user input setting that includes a desired wash cycle (as an example) corresponding to the food product to be cleaned. For example, a particular wash cycle may be selected pertaining to a type of food product to be cleaned by the assembly 100. And, the selected wash cycle may be associated with a specific cleaning time and/or a specific fluid circulation system pump 136 operation (e.g., fluid flow rate, variable fluid flow rates, pump speed, etc.) for the specific food product. The illustrated graphical user interface 182 is also configured to display different parameters of the washing fluid (e.g., pH, conductivity temperature, etc.) as well as cleaning time remaining for the selected wash cycles. Processing modules may also include one or more output devices (e.g., USB ports, serial ports, etc.) for use in extracting or uploading data stored in the processing modules within the scope of the present disclosure.

In other example embodiments, food preparation assemblies may be operable with a single wash cycle configured to allow washing of all food products washed with the food preparation assemblies using the single wash cycle. For example, a common cycle may be used with the food preparation assemblies. However, the common cycle maybe adjusted, modified, extended etc. as desired by an operator (e.g., extended for heavily soiled food products, etc.).

In still other example embodiments, food preparation assemblies may be operable with wash cycles coordinated generally to baskets located within the food preparation assemblies. For example, if two baskets fit within a wash chamber of a food preparation assembly, the assembly may include a different alarm, lighted indicator, etc. for each basket indicating cleaning of the food products in the basket is complete.

Multiple different wash cycles (as an example) may be available for selection on the illustrated graphical user interface 182. If multiple different food products are to be cleaned with the washing fluid generally simultaneously, multiple different wash cycles may be selected. And when a wash cycle is completed (e.g., a cleaning time has elapsed, etc.) for a given food product, an alarm may sound, a light may flash, etc. indicating that the food product associated with the completed wash cycle is clean. As an example, a first wash cycle may be associated with fruits; a second wash cycle may be associated with leafy greens; a third wash cycle may be associated with melons; and a fourth wash cycle may be associated with rooted products. Wash cycles other than those indicated herein and/or other combinations of wash cycles may be available within the scope of the present disclosure. Moreover, wash cycles may not be limited to just time variances. For example, pump speeds can also be altered to coordinate with timing to help provide additional cleaning operation without bruising produce, etc. An amount of agitation of washing fluid in the washing chamber 112 (e.g., via the fluid circulation system 134 and its pump 136, etc.) may be altered for different food products, may be varied over time for a given food product, etc.

The printing device 184 is disposed generally adjacent the graphical user interface 182 and may include any suitable printer within the scope of the present disclosure. When a wash cycle is complete for a given food product, the printing device 184 may print a label indicative of completion of cleaning of the food product by the assembly 100. Alternatively, when a wash cycle is complete, an operator may manually operate the printing device 184 to print a label indicative of completion of cleaning of the food product by the assembly 100. The printed labels may include, as an example, measured parameters (e.g., food description, time lapse, pH, conductivity, temperature, etc.) of the washing fluid used to clean the food product, date of cleaning, time of cleaning, cleaning cycle duration, etc. In addition, labels may be provided on any suitable medium, for example, traditional paper, paper that dissolves under hot water (e.g., formed from potato starch, etc.) such that the labels can be removed without scraping, etc.

In other example embodiments, food preparation assemblies may include remote processing modules operable to control the assemblies from remote locations away from the food preparation assemblies. In still other example embodiments, food preparation assemblies may include remote processing modules operable to compile operational data of the assemblies and to report (e.g., to a remote user, etc.) statistics on usage and functions of the assemblies. In still further example embodiments, food preparation assemblies may include processing modules in which printing devices may not be included in processing modules. In some example embodiments, printing devices may be located elsewhere on food preparation assemblies. In other example embodiments, printing devices may be located separate from food preparation assemblies and operable therewith via remote interfaces with the assemblies.

In still further example embodiments, remote mechanisms may be included to extract data gathered by microprocessors within processing modules of food preparation assemblies.

Figure 9:
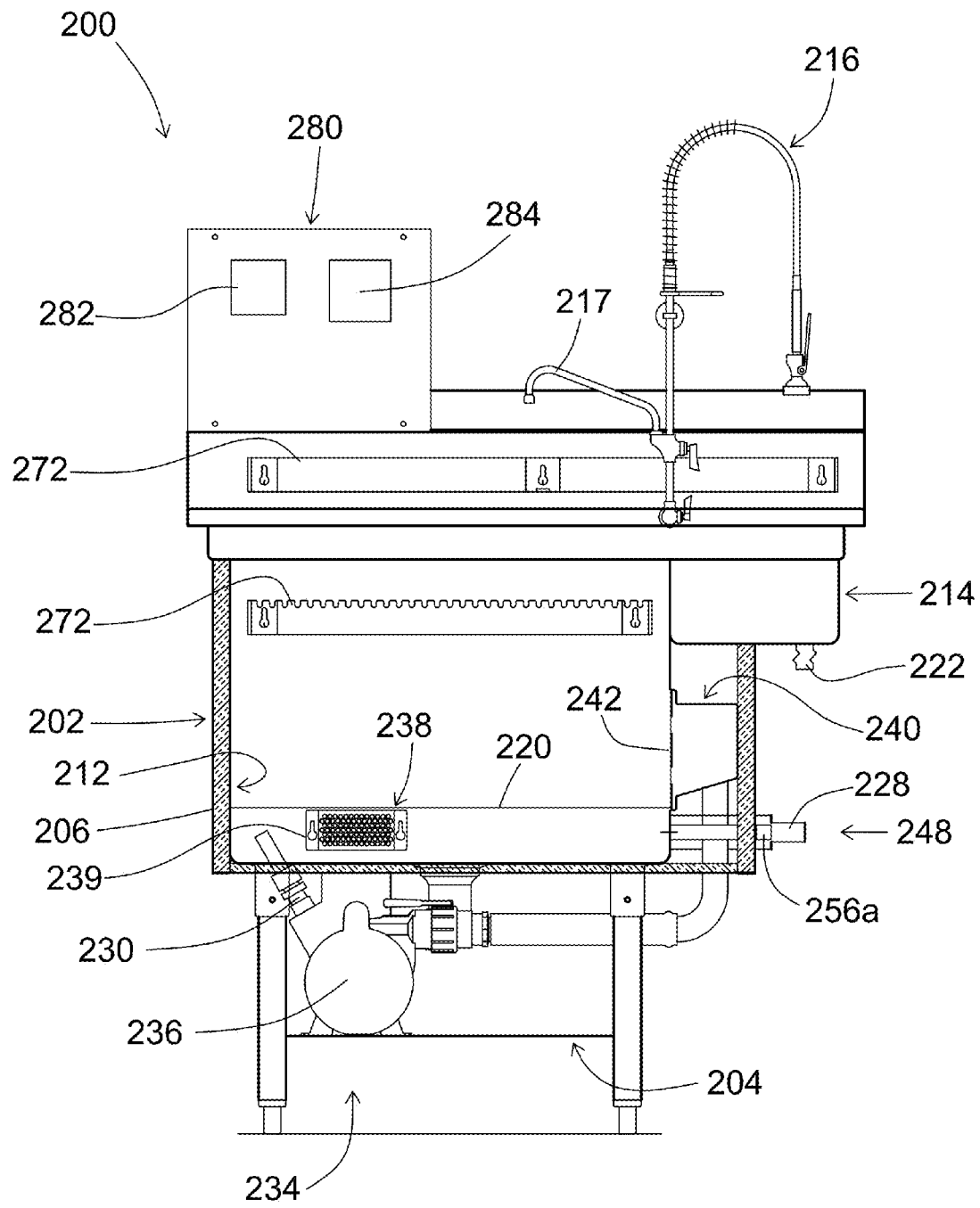
FIG. 9 is a forward elevation view of another example embodiment of a food preparation assembly including one or more features of the present disclosure, with part of a tank removed to show internal construction of the assembly.
Figure 10:
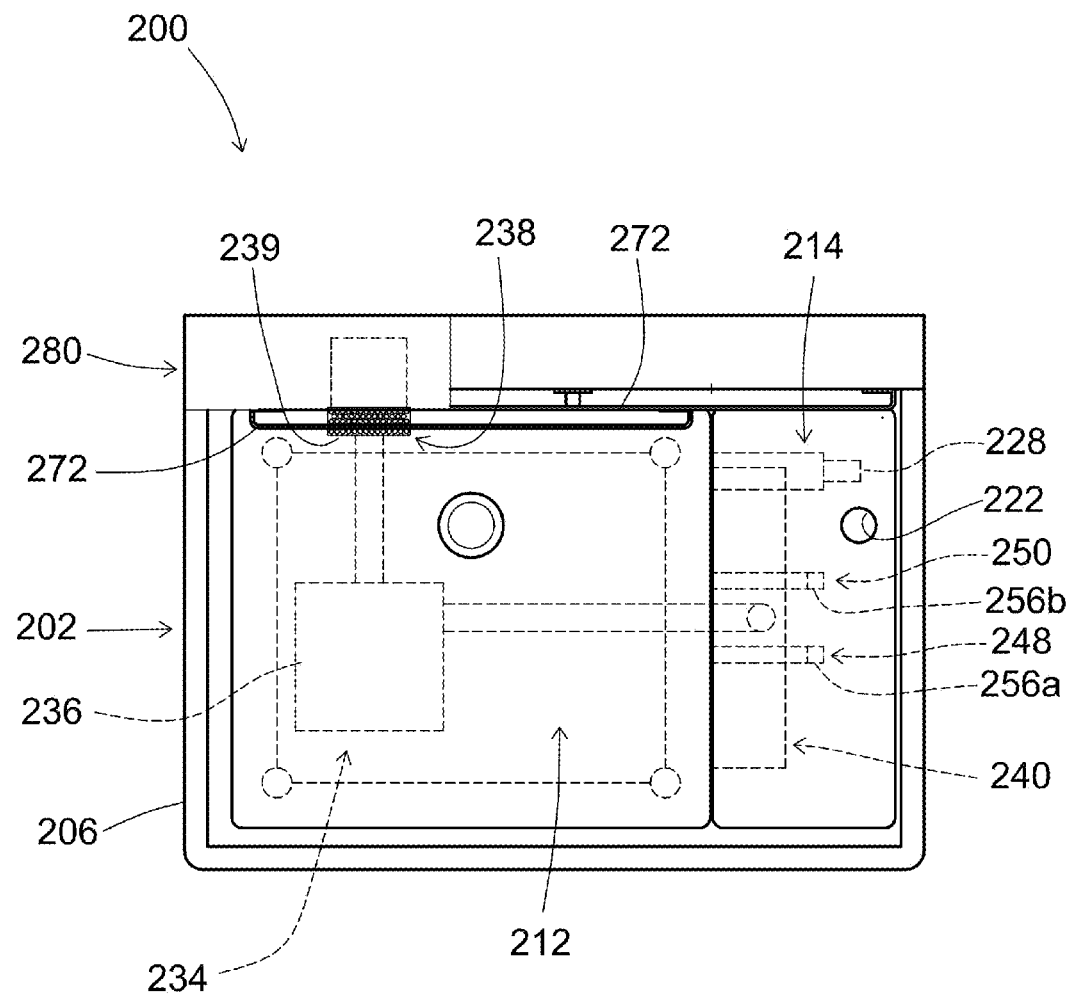
FIG. 10 is a top plan view of the food preparation assembly of FIG. 9, with a spraying fixture removed from a rearward wall of a tank of the assembly and with a false bottom removed from a washing chamber of the assembly, and with hidden components thereof shown with broken lines.

FIGS. 9 and 10 illustrate another example embodiment of a food preparation assembly 200 including one or more aspects of the present disclosure. The assembly 200 is configured for use, for example, to clean food products and to label the cleaned food products, for example, as part of a quality assurance program, etc. indicating that the food products have been cleaned. The example embodiment may include innovative food product washing equipment and may provide procedures designed to help monitor and assure compliance with established food safety programs.

The illustrated food preparation assembly 200 generally includes a tank 202 that generally defines a washing chamber 212 and a rinsing chamber 214. The rinsing chamber 214 may be configured (e.g., sized, shaped, constructed, etc.) for use to subsequently rinse the food products after cleaning. The washing chamber 212 may be configured for holding washing fluid for use in cleaning the food products. Rails 272 are located along a rearward portion of the tank 202, as well as within the washing chamber 212, for supporting baskets (not shown) holding food products before, during, and/or after cleaning operation. A spraying fixture 216 is also mounted to a rearward portion of the tank 202 generally above the rinsing chamber 214 for providing fluid (e.g., water, etc.) as desired to the rinsing chamber 214 and/or washing chamber 212. And a discharge faucet 217 is located adjacent the spraying fixture 216 for use in providing fluid (e.g., water, etc.), for example, to the washing chamber 212 for filling the washing chamber 212 with water, etc. The illustrated discharge faucet 217 is generally formed as a single unit with the spraying fixture 216.

Walls 206 of the illustrated tank 202 each generally include two panels spaced apart and including insulation therebetween (such that the tank 202 is generally insulated) to help inhibit heat transfer through the walls 206 as well as the formation of condensation on outsides of the walls 206 caused, for example, by temperature differences of fluid within the tank 202 and ambient air around the tank 202.

The rinsing chamber 214 is configured for use in rinsing the food products after they are cleaned in the washing chamber 212. For example, the rinsing chamber 214 is configured to retain the cleaned food products, hold fluid for use in rinsing the cleaned food products, catch fluid used to rinse the cleaned food products, to retain loose food particles, etc. that may be rinsed from the cleaned food products, etc. A drain 222 is provided in a bottom portion of the rinsing chamber 214 for removing rinsing fluid from the final rinsing chamber 214 as desired. It should be appreciated that rinsing the food products after they are cleaned in the washing chamber 212 may not be required (such that the rinsing chamber 214 may not be used or may be used for other purposes).

Sensors may be provided in the food preparation assembly 200 for measuring different parameters of the washing fluid. The sensors may be positioned in fluid communication with the washing fluid (e.g., at least partially within the washing chamber 212, etc.) for measuring the different parameters. Parameters of the washing fluid to be measured may include washing fluid level in the tank 202, pH, temperature, conductivity, etc. And the sensors may include, but are not limited to, float switches, pH probes, ORP probes, conductivity probes, thermometers, thermostats, thermocouples, etc.

The illustrated food preparation assembly 200 also includes a fluid circulation system 234 disposed generally in fluidic communication with the washing chamber 212 for recirculating washing fluid within the washing chamber 212. The recirculating operation of the fluid circulation system 234 moves, agitates, provides turbulence to, mixes, etc. the washing fluid in the washing chamber 212. This may allow for mixing a wash agent with the washing fluid in the washing chamber 212, for helping clean the food products in the washing chamber 212 (e.g., for improving scrubbing action and friction of the washing fluid on the food products, etc.), etc.

The illustrated fluid circulation system 234 generally includes a pump 236 disposed generally on a shelf 204 under the washing chamber 212, an intake 238 positioned generally in a bottom portion (e.g., in a rearward side wall portion, etc.) of the washing chamber 212, and a discharge manifold 240 defined in a side wall portion of the washing chamber 212. A perforated cap 239 is disposed generally over the intake 238, for example, to help inhibit ingress of food particles, etc. through the intake 238 to the pump; and a cover plate 242 is disposed generally over the discharge manifold 240 to discharge washing fluid into the washing chamber 212 through openings in the cover plate 242, which can be altered or substituted by other cover plates to adjust wash fluid flow patterns and pressure as desired.

In operation of the fluid circulation system 234, the pump 236 operates to draw, remove, etc. washing fluid from the washing chamber 212 through the intake 238 and to the pump 236. The pump 236 then directs the washing fluid to the discharge manifold 240 for discharge back into the washing chamber 212 (through the cover plate 242). As such, the intake 238 and the discharge manifold 240 are in fluidic communication with the pump 236. The cover plate 242 of the discharge manifold 240 allows fluid to build up pressure and velocity in the discharge manifold 240 behind the cover plate 242 such that it can be discharged into the washing chamber 212 under pressure through the openings in the cover plate 242. The pressurized discharge provides turbulence in the washing chamber 212 for agitating, mixing, etc. the washing fluid in the washing chamber 212. It should be understood that any suitable pump may be used for operation with the fluid circulation system 234 within the scope of the present disclosure. For example, pumps operable at about 100 gallons per minute, more than 100 gallons per minute, less than 100 gallons per minute, etc. may be used. In addition, pumps operable at variable speeds, for example, to alter recirculation rates, etc. and thereby alter cleaning operation of food products within the washing chamber 212, may be used.

The illustrated food preparation assembly 200 also includes systems, devices, etc. for controlling, adjusting, etc. the pH, conductivity, foaming characteristics, etc. of the washing fluid. For example, the illustrated assembly 200 includes two injection devices 248 and 250 located adjacent the washing chamber 212 for use in controlling, adjusting, etc. the pH, conductivity, measured wash agent concentration, measured wash fluid concentration, foaming properties, etc. of the wash agent and/or washing fluid. The injection devices 248 and 250 may be in communication with the sensors to help determine when operation of the injection device is necessary. The injection devices 248 and 250 may include metered injection devices within the scope of the present disclosure.

The two illustrated injection devices 248 and 250 are disposed generally under the rinsing chamber 214. Each of the injection devices 248 and 250 generally includes a pump (not shown) and a discharge 256a and 256b positioned in a side wall portion of the tank 202 and washing chamber 212. Conduit may extend from a wash agent container (not shown) to pump, and from the pump to discharge 256a. Similarly, conduit may extend from an antifoaming agent container (not shown) to pump, and from the pump to the discharge 256b.

In operation of a first injection 248 device, the pump activates when, for example, the pH, conductivity, etc. of the washing fluid, the pH, conductivity, etc. of the wash agent, chemical, etc. concentration, other indicator (e.g., other measure of acid content, base concentration, etc.), etc. of the washing fluid and or wash agent moves away from a predetermined, desired, etc. value and/or moves out of a predetermined, desired, etc. range (e.g., as measured by a pH probe 230, other sensor, etc. (not shown), etc.). The activated pump then operates to draw, remove, pump, etc. wash agent from the wash agent container and directs the wash agent to the discharge 256a for discharge into the washing chamber 212.

In operation of a second injection device 250, the pump activates (e.g., automatically, etc.) at predetermined, desired, etc. intervals during operation of the assembly 200 for dispensing predetermined, desired, etc. volumes of an antifoaming agents, or may be, for example, activated when the antifoaming agent concentration, other indicator, etc. of the washing fluid and/or antifoaming agent moves away from a predetermined, desired, etc. value and/or moves out of a predetermined, desired, etc. range.

In the illustrated embodiment, the washing fluid may be manually cooled, chilled, etc. by adding ice, or other acceptable cooling agent, etc. to the washing fluid in the washing chamber 212 as desired. It should be appreciated, however, that adding ice, other cooling agents, etc. may not be required if the washing fluid source is already adequately cooled. A perforated false bottom 220 is disposed generally over the intake 238 of the fluid circulation system 234 (and generally above the bottom portion of the washing chamber 212) to hold the ice above the bottom portion of the washing chamber 212 and to help inhibit ingress of food particles into the intake 238. A sensor including a thermometer, thermocouple, probe, etc. may be positioned in fluidic communication with the washing fluid (e.g., at least partly within the washing chamber 212, etc.) to measure a temperature of the washing fluid. If the temperature moves away from a predetermined, desired, etc. value or range of values, an alarm may sound indicating that additional ice, for example, should be added to the washing chamber 212.

The illustrated food preparation assembly 200 further includes a pluggable processing module 280 operable to control operation of the assembly 200. The processing module 280 is in communication with the sensors, the fluid circulation system 234, and the injection devices 248 and 250 of the assembly 200. And, as such, the processing module 280 can operate to control, adjust, etc. different parameters (e.g., the pH, conductivity, temperature, operation speeds, timed operations, foaming characteristics, fluid levels, etc.) of the washing fluid (e.g., notify if ice is required, wash agent is required, antifoaming agent is required, water is required to increase fluid level in the washing chamber 212, etc.), etc. through control of the fluid circulation system 234, the injection devices 248 and/or 250, etc. and/or alarm (e.g., noise, lights, etc.) operators that parameters of the washing fluid have moved away from predetermined, desired values and/or ranges.

The processing module 280 may include a user interface control network 282 and a printing device 284. The user interface 282 may include a graphical user interface 282 configured to receive at least one user input (e.g., a wash cycle, etc.) related to cleaning food products. The printing device 284 is disposed adjacent the graphical user interface 282 and may include any suitable printer within the scope of the present disclosure. For example, when cleaning of a food product is complete for a given food product, the printing device 284 may print a label indicative of completion of cleaning of the food product.

Figure 11:
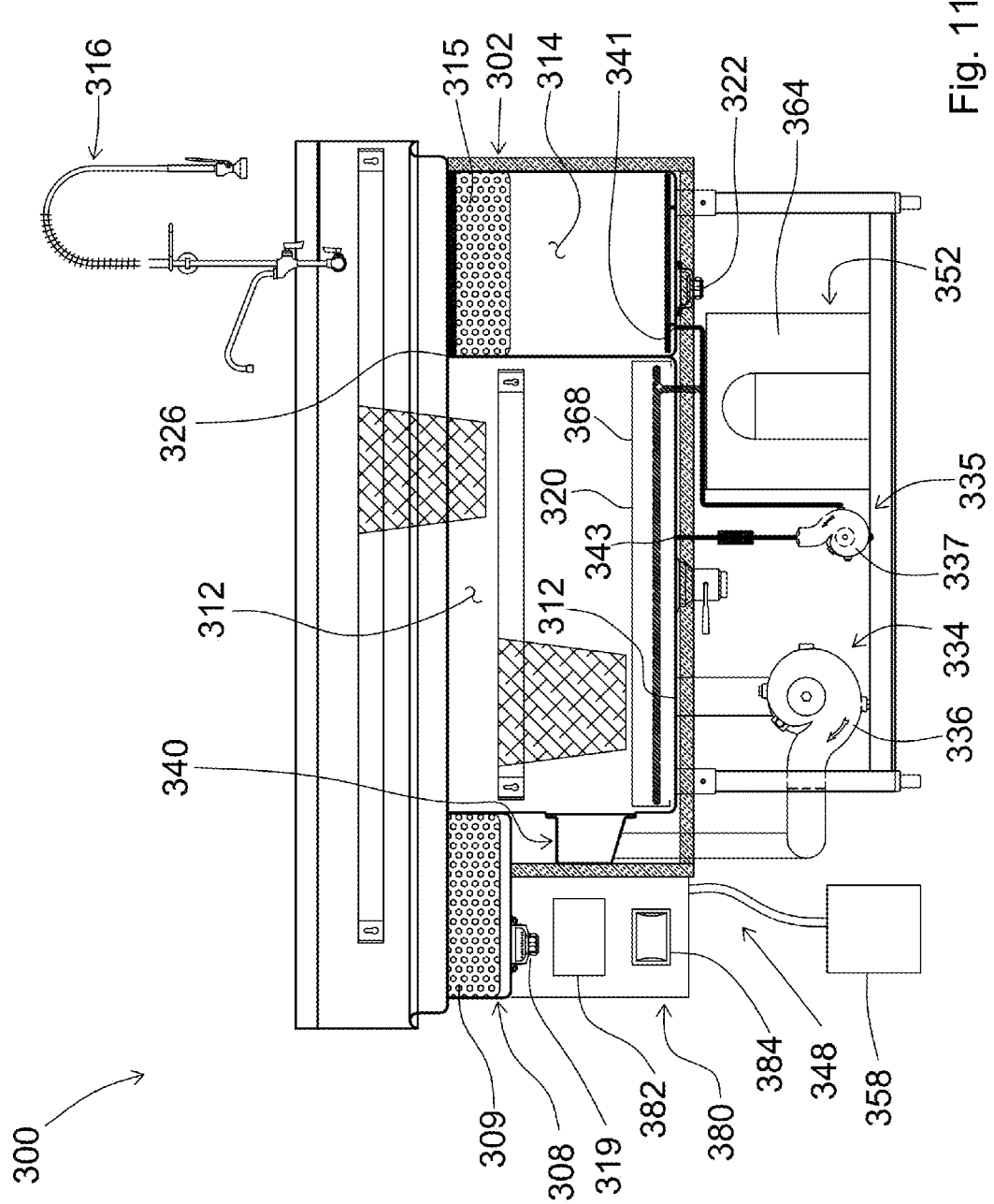
FIG. 11 is a forward elevation view of another example embodiment of a food preparation assembly including one or more features of the present disclosure, with part of a tank removed to show internal construction of the assembly.
Figure 12:
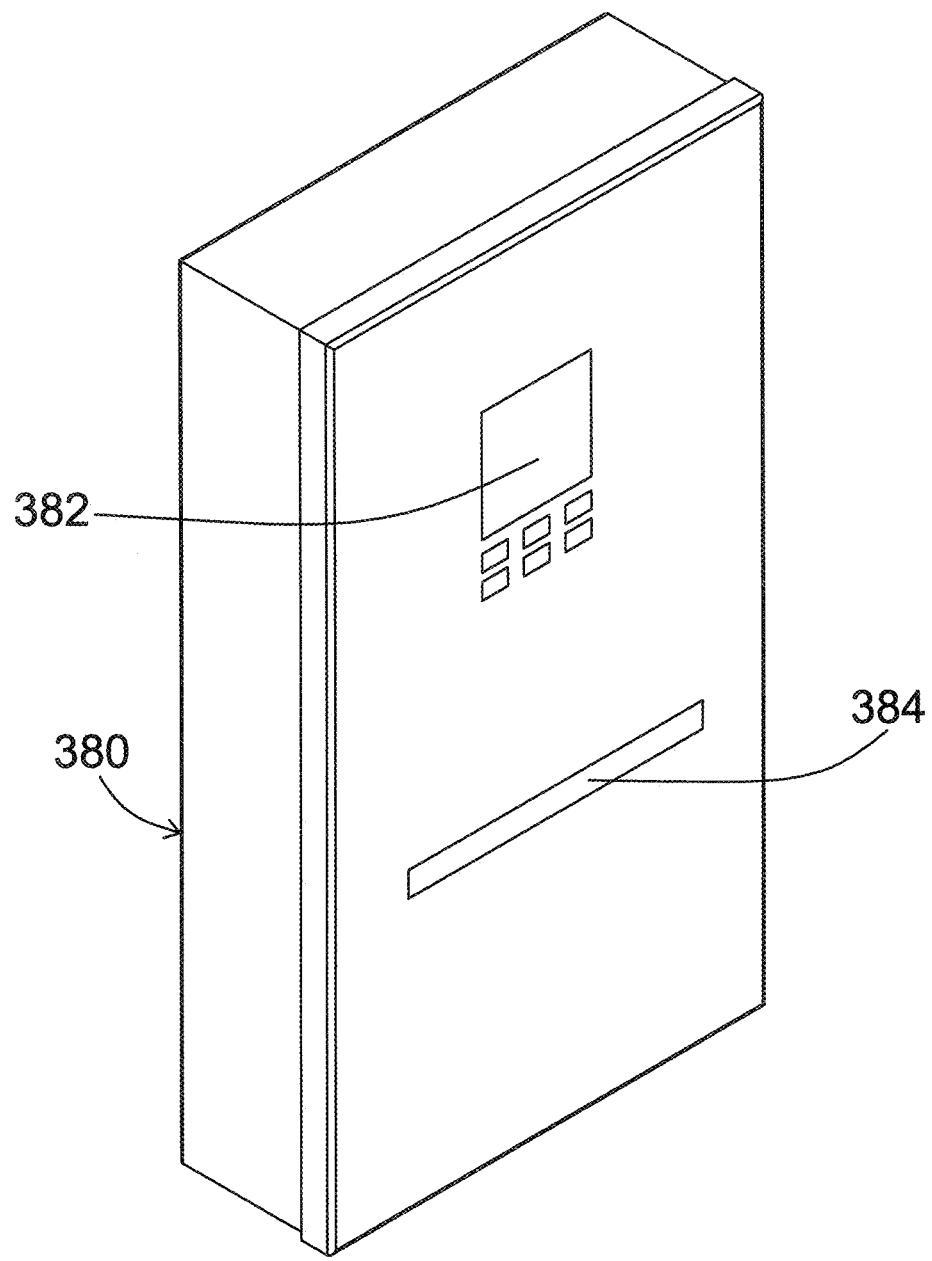
FIG. 12 is a perspective view of an example processing module of the food preparation assembly of FIG. 11.

FIGS. 11 and 12 illustrate another example embodiment of a food preparation assembly 300 including one or more aspects of the present disclosure. The food preparation assembly 300 is configured for use, for example, to clean food products and to label the cleaned food products, for example, as part of a quality assurance program, etc. indicating that the food products have been cleaned. The example embodiment may include innovative food product washing equipment and may provide procedures designed to help monitor and assure compliance with established food safety programs.

As shown in FIG. 11, the illustrated food preparation assembly 300 generally includes a tank 302 defining a pre-rinsing chamber 308, a washing chamber 312, and a final rinsing chamber 314. The pre-rinsing chamber 308 (and/or the final rinsing chamber 314) may be configured (e.g., sized, shaped, constructed, etc.) for use to initially rinse the food products (e.g., rinsing dirt, loose food particles, etc. from the food products, etc.); the washing chamber 312 may be configured for holding washing fluid for use in cleaning the food products; and the final rinsing chamber 314 (and/or the pre-rinsing chamber 308) may be configured for rinsing the food products after they are washed and/or for receiving overflow washing fluid from the washing chamber 312.

A spraying fixture 316 is mounted to a rearward portion of the tank 302 generally above the pre-rinsing chamber 308 and the final rinsing chamber 314.

The pre-rinsing chamber 308 includes a perforated catch basin 309 disposed therein for screening, filtering, etc. soil, loose food particles, etc. that may be initially rinsed from the food products. The screened, filtered, etc. fluid used to initially rinse the food particles may pass through the perforated catch basin 309 (while the soil, loose food particles, etc. are retained in the perforated catch basin 309) to a drain 319 located in a bottom portion of the pre-rinsing chamber 308. The perforated catch basin 309 may then be removed from the pre-rinsing chamber 308 to facilitate removal of the retained soil, food particles, etc. as necessary.

The final rinsing chamber 314 also includes a perforated catch basin 315 disposed therein for screening, filtering, etc. loose food particles, etc. that may be rinsed from the food products after cleaning (e.g., after cleaning in the washing chamber 312, etc.). The screened, filtered, etc. fluid used to rinse the cleaned food particles may pass through the perforated catch basin 315 (while any loose food particles, etc. are retained in the perforated catch basin 315) for collection in the final rinsing chamber 314 and/or removal from the final rinsing chamber 314 through a drain 322 located in a bottom portion of the final rinsing chamber 314. The perforated catch basin 315 may be removed from the final rinsing chamber 314 to facilitate removal of the retained food particles, etc. as necessary. The illustrated final rinsing chamber 314 also includes a weir structure 326 to allow washing fluid from the washing chamber 312 to overflow to the final rinsing chamber 314 (through the perforated catch basin 315) for collection in the final rinsing chamber 314 and/or removal (e.g., through the drain 322, etc.) as necessary.

The illustrated food preparation assembly 300 also includes first and second fluid circulation systems 334 and 335 disposed generally in fluidic communication with the washing chamber 312 of the tank 302. The first fluid circulation system 334 is provided for recirculating washing fluid within the washing chamber 312 of the tank 302, and the second fluid circulation system 335 is provided for circulating washing fluid from the final rinsing chamber 314 to the washing chamber 312 as desired.

The recirculating operation of the first fluid circulation system 334 moves, agitates, provides turbulence to, mixes, etc. the washing fluid in the washing chamber 312 for mixing the wash agent with the washing fluid in the washing chamber 312, for helping clean the food products in the washing chamber 312 (e.g., for improving scrubbing action of the washing fluid on the food products, etc.), etc. The illustrated system 334 generally includes a pump 336 disposed generally under the tank 302, an intake 338 positioned generally in a bottom portion (or alternatively in a back portion) of the washing chamber 312, and a discharge manifold 340 defined in a side wall portion of the washing chamber 312.

The circulating operation of the second fluid circulation system 335 moves washing fluid from the final rinsing chamber 314 to the washing chamber 312 as desired, for example, if the washing fluid level in the washing chamber 312 moves below a predetermined level (e.g., as measured by a float switch 228, etc.). The illustrated system 335 generally includes a pump 337 disposed generally under the tank 302, an intake 341 positioned generally in the bottom portion of the final rinsing chamber 314, and a discharge 343 positioned generally in the bottom portion of the washing chamber 312.

In operation of the second fluid circulation system 335, the pump 337 activates when, for example, the washing fluid level in the washing chamber 312 moves below a predetermined, desired, etc. level (e.g., as measured by the float switch, etc.). The activated pump 337 then operates to draw, remove, etc. washing fluid from the final rinsing chamber 314 through the intake 341 and to the discharge 343 for discharge into the washing chamber 312. As such, the intake 341 and the discharge 343 are in fluidic communication with the pump 337. It should be understood that any suitable pump may be used for operation with the second fluid circulation system 335 within the scope of the present disclosure. In some example embodiments, second fluid circulation systems may cease to operate when washing fluid moves to or above predetermined, desired, etc. levels (e.g., as measured by float switches, etc.).

The illustrated food preparation assembly 300 also includes systems, devices, etc. for controlling, adjusting, etc. the different parameters (e.g., the pH, the conductivity, the temperature, the foaming characteristics, etc.) of the washing fluid. For example, the illustrated assembly 300 includes an injection device 348 coupled to the tank 302 for controlling, adjusting, etc. the pH, conductivity, etc. of the washing fluid and a cooling device 352 coupled to the tank 302 for controlling, adjusting, etc. the temperature of the washing fluid. The injection device 348 and the cooling device 352 may be in communication with sensors to help determine when their operation is necessary.

The illustrated injection device 348 generally includes a pump (not shown) disposed generally under the pre-rinsing chamber 308 of the tank 302 for pumping wash agent from a wash agent container 358 to a discharge (not shown) positioned generally in a side wall portion of the washing chamber 312. In operation of the injection device 348, the pump activates when, for example, the pH, conductivity, etc. of the washing fluid, the pH, conductivity, etc. of the wash agent, chemical, etc. concentration, other indicator (e.g., other measure of acid content, base concentration, etc.), etc. of the washing fluid and or wash agent moves away from a predetermined, desired, etc. value and/or moves out of a predetermined, desired, etc. range (e.g., as measured by a pH probe, other sensor, etc. (not shown), etc.).

The illustrated cooling device 352 generally includes a refrigeration unit 364 disposed generally under the tank 302, and an evaporator coil 368 disposed within the washing chamber 312 and below a false bottom 320 thereof (e.g., in communication with the tank 302, etc.). The refrigeration unit 364 may include any suitable unit within the scope of the present disclosure.

As shown in FIG. 12, the illustrated assembly 300 further includes a pluggable processing module 380 having a user interface 382 and a printing device 384. The processing module 380 is operable to control operation of the assembly 300. The processing module 380 is in communication with the sensors (e.g., the float switch, the pH probe, the thermometer, etc.), the first and second fluid circulation systems 334 and 335 (e.g., with the pumps 336 and 337 thereof, etc.), and the injection device 348, the cooling device 352, etc. of the assembly 300. And as such, the processing module 380 can operate to automatically control, adjust, etc. different parameters (e.g., washing fluid level, the pH, conductivity, temperature, etc.) of the washing fluid through control of the fluid circulation systems 334 and 335, the injection device 348, the cooling device 352, etc.

FIGS. 13-18 schematically illustrate an example method including one or more aspects of the present disclosure. The example method may be used, for example, for preparing food products for distribution, consumption, storage (e.g., short-term storage, etc.), etc., and for providing quality assurance that the food products have been properly cleaned. Food products may include fruits, vegetables, produce, other food products, etc. within the scope of the present disclosure.

Figure 13:
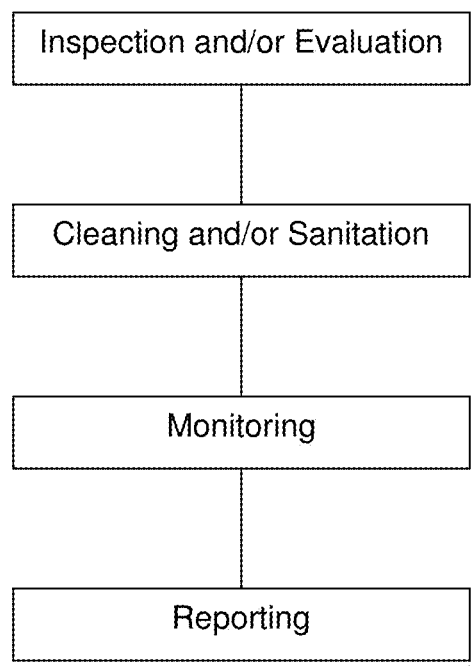
FIG. 13 is a schematic illustrating example processes of a food preparation method including one or more features of the present disclosure.

As shown in FIG. 13, the example method generally includes an inspection and/or evaluation process, a cleaning and/or sanitation process, a monitoring process, and a reporting process performed in connection with the food products. It should be noted generally that the term "process" is used in the disclosure and claims to refer to a single operation or a plurality of operations. And, it should also be noted that performance of "processes" disclosed herein is not necessarily sequential or in any particular order.

Food products are typically delivered in bulk to destinations for subsequent distribution, preparation, prepackaging, consumption, storage (e.g., short-term storage, etc.), etc. Upon receiving a delivery of food products, the food products may be inspected (e.g., via the inspection and/or evaluation process, etc.) for cleanliness and visible damage and insect or vermin control. In addition during the inspection process, bills of lading may be compared with the food products delivered for accuracy, and the food products may be preliminarily labeled (e.g., date of delivery, "use by" date, country of origin, etc.) and stored as desired for further processing (e.g., cleaning, labeling, distribution, consumption, etc.). This inspection process can, for example, help assure that the delivered food products properly proceed to the example cleaning process, monitoring process, and/or labeling process free of visible defects and/or visible damage and/or infestations.

The illustrated example cleaning process (FIG. 14) generally includes another inspection process of the food products (e.g., for visual damage, date of delivery, acceptable "use by" date, etc.), and a rinsing process, which may or may not be necessary. The subsequent inspection process provides a further quality control, assurance, etc. check of the food products. And the rinsing process allows for rinsing the food products, for example, with a suitable fluid (e.g., water, etc.) to remove loose soil, loose food particles, etc. from the food products prior to further cleaning. As an example, the rinsing process may be accomplished with a pre-rinse spray faucet, etc. using water to rinse the food products to remove loose soil, loose food particles, etc. that may interfere with, hinder, etc. further cleaning.

After the rinsing process, the food products are ready for further cleaning. For example, in the illustrated cleaning process the rinsed food products are further cleaned with a washing fluid in a tank. This further cleaning may include, for example, initially rinsing the tank with washing fluid (e.g., water, wash agent, combinations of water and wash agent, etc.) to avoid contamination from prior cleaning processes in the tank, and filling the tank with washing fluid to a desired level. The washing fluid filling the tank may be prepared (e.g., prior to filling the tank, after filling the tank, etc.) to include at least one or more desired parameters (e.g., pH, conductivity, temperature, etc.) having at least one or more desired values or range of values. For example, the washing fluid filling the tank may be prepared to include a pH of about 3.4 (for cleaning, etc.) and/or a temperature of about 45 degrees Fahrenheit (e.g., for crisping, etc.). Desired values or range of values for desired parameters may be different than disclosed herein within the scope of the present disclosure, for example, depending on the food products being cleaned.

The washing fluid used in the further cleaning of the food products may include any suitable washing fluid such as, for example, water, chlorine, iodine, combinations thereof, etc. In addition, a wash agent may be included in the washing fluid to help with, enhance, etc. cleaning the food products, including any suitable wash agents, food cleansers, organic food cleansers, all natural food cleansers, antibacterial agents, etc. In addition, the wash agent may be provided to help prepare the washing fluid to have, for example, a desired pH (e.g., a pH of about 3.4, etc.), conductivity, etc. and, for example, contains water, oleic acid, glycerol, ethyl alcohol, potassium hydrate, baking soda, citric acid, and distilled grapefruit oil and is generally acidic such that its provision into the washing fluid may be used to reduce pH of the washing fluid as desired. Further, antifoaming agents may be provided to help inhibit formation of foam in the washing fluid. And, cooled, chilled, etc. washing fluid may be provided to help prepare the washing fluid to have, for example, a desired temperature (e.g., a temperature of about 45 degrees Fahrenheit, etc.). For example, the washing fluid may be cooled, for example, by adding chilled water, ice, introducing other cooling means (e.g., refrigeration through evaporator coils in the tank, etc.), etc. within the scope of the present disclosure.

Figure 14:
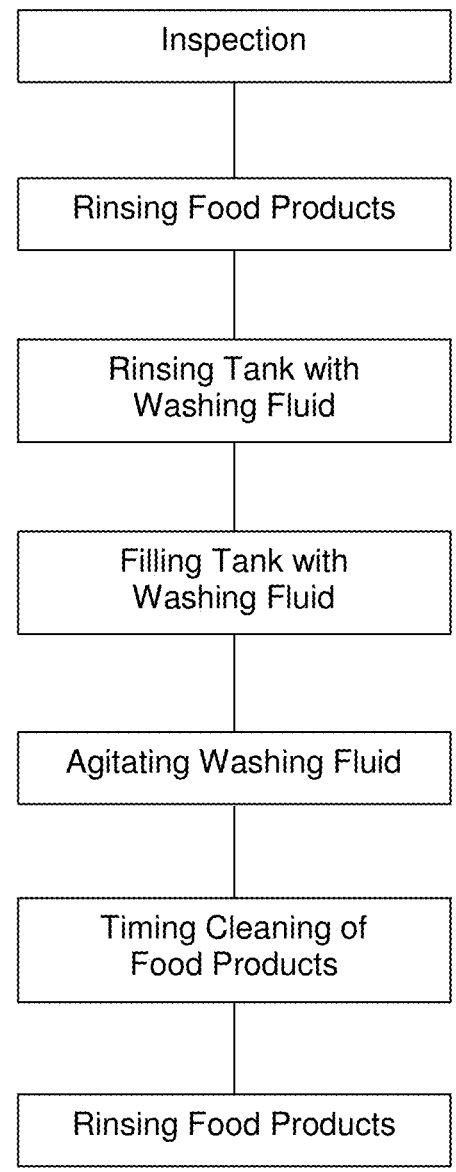
FIG. 14 is a schematic illustrating example components of a cleaning process of the method of FIG. 13.
Figure 15:
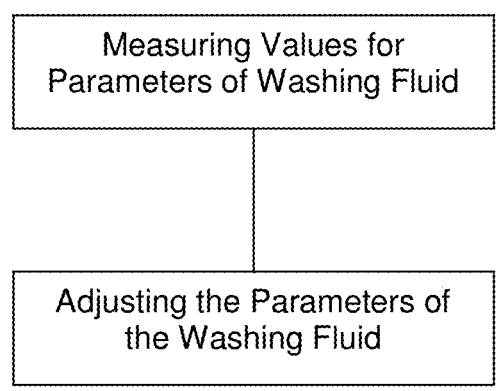
FIG. 15 is a schematic illustrating example components of a monitoring process of the method of FIG. 13.

With continued reference to FIG. 14, the illustrated cleaning process also includes an agitating process to agitate the washing fluid (e.g., in the tank, etc.) to help improve cleaning of the food products. For example, agitating the washing fluid can help create surface friction on the food products which in turn can help the washing fluid and/or wash agent penetrate crevices of the food products and help improve, enhance, etc. cleaning. A change of speeds (e.g., via circulation pumps, etc.) can be used to control specific frictions to meet different produce surface compositions. Also for example, the agitating process may include operating a pump to remove washing fluid from the tank through an intake and to introduce the removed washing fluid back into the tank through a discharge. Other suitable processes for agitating fluid may be used within the scope of the present disclosure.

The food products can be positioned and/or held within the washing fluid by any suitable means. For example, the food products may be held in baskets to allow food products of differing types to be cleaned generally simultaneously in the tank, and to allow easy transfer of the food products, as desired.

The food products are cleaned in the washing fluid (e.g., in the washing chamber, etc.) for a desired amount of time (e.g., for a desired cleaning time, etc.). A suitable timing device, such as a timer, etc., may be used to track the cleaning time. The cleaning time may be generally constant for each food product, may be manually adjusted as desired, may generally correspond to the type of food product being cleaned, may correspond to a container holding the food product, etc. within the scope of the present disclosure. Thus, different cleaning times may or may not be used for different food products. For example, food products having increased crevasse such as lettuce, broccoli, etc. may require longer cleaning times than food products having generally smoother surfaces such as tomatoes, apples, oranges, etc.

As an example, the selected wash cycle may be associated with a specific cleaning time for a specific food product or for a basket positioned in a washing chamber, or with a positioning of food products in a washing chamber, or with a specific agitation amount (or variation in agitation amount) of washing fluid within a washing chamber, etc. Multiple different wash cycles may be available for selection. If multiple different food products are to be cleaned with the washing fluid generally simultaneously, multiple different wash cycle selections may be selected at once (such that they may overlap). Here, when a wash cycle selection is completed (e.g., a cleaning time has elapsed, an agitation cycle has elapsed, etc.) for a given food product, an alarm (e.g., sound, siren, light, etc.), lighted indicator, etc. may sound, illuminate, etc. indicating that the food product associated with the completed wash cycle selection. Wash cycles other than those indicated herein and/or other combinations of wash cycles may be available within the scope of the present disclosure.

As a further example, the desired wash cycle (or desired wash time) may be selected from a user interface for each type food product to be cleaned in the given washing fluid. The user interface may be coupled to the tank or may include a remote device coupled to the tank through a network interface. Here, food products may be contained in baskets positioned in the tank. A wash cycle may be selected from the user interface for each basket of food product positioned in the tank. And an alarm may signal to indicate completion of a wash cycle. Subsequent batches of food products may be prepared while the prior batches are being cleaned. When one batch is complete, the subsequent batches can be loaded into the baskets for cleaning.

After the food products are cleaned with the washing fluid, they can be rinsed, for example, with a suitable fluid (e.g., water, etc.) to remove washing fluid and/or wash agent residue on the food products prior to further processing. The food products can then be transferred to a preparation area for processing (e.g., distribution, consumption, storage (e.g., short-term storage, etc.), etc.). For example, the food products may be removed from baskets used during the cleaning operation to a preparation surface for cutting, packaging (e.g., in containers, etc.), storage, etc. in preparation for labeling, as described in further detail hereinafter.

The example monitoring process (FIG. 15) of the example method generally includes a measuring process and an adjusting process. The measuring process generally includes measuring one or more parameters (e.g., fluid level, pH, conductivity, temperature, washing fluid concentration, wash agent concentration, etc.) of the washing fluid. Measuring the one or more parameters of the washing fluid may be done, for example, before the cleaning process begins, during the cleaning process, and/or after the cleaning process is complete for given food products and or cycles. And the adjusting process generally includes adjusting at least one or more measured parameters of the washing fluid in the tank to a desired setting, as (or if) necessary.

As an example, pH, conductivity, etc. of the washing fluid in the tank may be measured using suitable devices (e.g., a pH probe, an ORP probe, etc.). The measured pH, conductivity, etc. can be compared to a desired value or range of values (e.g., manually, automatically, etc.) and, if necessary, wash agent can be added to the washing fluid to adjust the pH, conductivity, etc. as necessary. For example, if a desired pH is about 3.4 for cleaning food products, wash agent may be injected into the washing fluid to lower the pH if it rises above 3.4.

The example monitoring process may also include an intermediate process where the measured value(s) of the one or more parameters of the washing fluid are reported to a processing module (e.g., from the sensors, etc.). The processing module may then operate to evaluate the measured value(s) and automatically adjust them as necessary (e.g., via various systems, units, etc. positioned in fluidic communication with the washing fluid, etc.).

Figure 16:
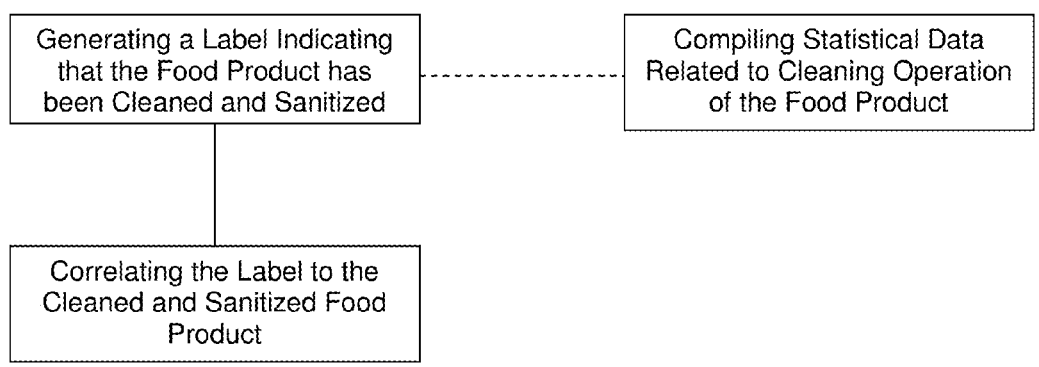
FIG. 16 is a schematic illustrating example components of a labeling process of the method of FIG. 13.
Figure 17:
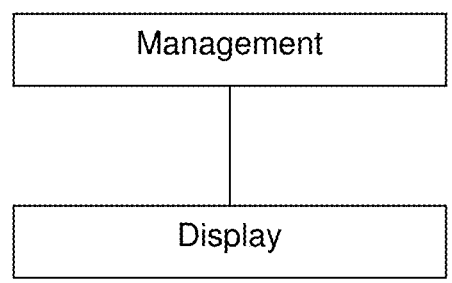
FIG. 17 is a schematic illustrating additional example processes of the method of FIG. 13.

FIG. 16 illustrates an example reporting process of the example method. The example reporting process includes a process of generating a label indicating that at least one food product has been cleaned with the washing fluid in the tank and a process of correlating the label to the cleaned food product. The generated labels pertain to the food products being cleaned. The labels may include, for example, one or more measured parameters of the washing fluid used to clean the food products. Alternatively, or in addition, the labels may include at least one or more of a cleaning time, a time of day of cleaning, a date of cleaning, etc. pertaining to the food products. And correlating the labels to the food products may include applying the label to the container holding the food products and/or to directly to the food products themselves. As an alternative, correlating the labels to the food products may include applying the label to other surfaces corresponding to the given food products (e.g., glass coverings in buffet lines, etc.).

As an example, the labels may be generated by using a printer. The printer may be coupled to the tank or may include a remote device coupled to the tank through a network interface. A print label button may be depressed on the printer to print the label. And the printed label may then be placed on the food product container, the food products, or on any other surface corresponding to the given food product. Duplicate labels may be printed for display or viewing by consumers, etc. (e.g., on a salad bar display, on a restaurant serving counter, etc.). This labeling can help assure that the food product has been washed.

The example reporting process can also include compiling data and providing statistics on usage and functions of the cleaning process, monitoring process, labeling process, etc. in one or more output format types. The data and/or statistics may include time period covered; energy consumption during cleaning process; cost of cleaning process; water usage; water cost; amount of cleaning chemicals used; average pH, conductivity, etc. values; average water temperature; amount of food products washed; number of labels generated during the labeling process; etc. FIG. 18 illustrates an example report that may be generated based on the data and/or statistics. The data and/or statistics may also be stored for later use (e.g., comparisons to other time periods, assurance, legal support, etc.), transmitted to management, etc. It should be appreciated that the reporting process With further reference to FIG. 17, the example method further includes a management process and a display process. The management process includes reviewing (from the reporting process) the data and/or statistics associated with the cleaning process, monitoring process, labeling process, etc. at predetermined intervals (e.g., including review the reports, etc.). And, the display process includes displaying cleaning indicia (e.g., phrases, pictures, slogans, etc.) that the food products being served, consumed, etc. at an establishment have been cleaned by the example method and/or wash agent. For example, servers, hosts, bus boys, food preparers, etc. may wear pins with such indicia. The display process may also include making available to consumers to view displays and/or food labels indicating one or more parameters of the inspection process, cleaning process, monitoring process, labeling process, etc. (e.g., date of cleaning, pH, conductivity, etc. levels during cleaning of certain food products, etc.). The display process may further include displaying logos indicating that the establishment cleans food with the example method, for example, in windows, by cash registers, in advertising and marketing campaigns, etc.

The example method may also include capturing and/or storing usage and/or operational data for monitoring adherence to a food safety program as desired.

In another example embodiment of the present disclosure, a method of operating a food preparation assembly may include at least one or more of the following operations. Turning on a food preparation assembly. Confirming that antimicrobial and antifoaming chemicals are sufficiently present for cleaning operations to be performed. Confirming that connections of hoses (e.g., into chemicals, etc.) is proper. Cleaning all equipment, utensils, container, storage devices, etc. with proper antibacterial chemical.

In addition, a processing module may begin analyzing parameter values of the food preparation assembly (e.g., at a startup/calibration setting of the processing module via a startup/calibration screen, etc.). For example, if a tank of the food preparation assembly is empty, the processing module may indicate that water needs to be added to the tank. As water is added to the tank, the processing module communicates with, for example, a float switch to indicate, monitor, etc. the amount of water present in the tank, and with a thermocouple to indicate, monitor, etc. a temperature of the water. The processing module may also indicate that the water needs to be cooled to a desired, predetermined value (e.g., by adding ice, by activating a compressor of a refrigeration unit, etc.) before further cleaning operations can be performed.

The processing module can also communicate with chemical pumps to dose initial predetermined amounts of antimicrobial chemical and antifoaming chemical to the water in the tank (thus producing washing fluid), as well as with a circulation pump to begin the flow of washing fluid through the tank (which facilitates mixing of the chemicals with the water within the tank). The processing module also monitors pH, conductivity, etc. levels of the washing fluid, for example, for a predetermined acid range, etc. to assure efficacy of the washing fluid. Should antimicrobial chemical level not be sufficient (e.g., based on pH, conductivity, etc. levels, etc.), the chemical pump doses a predetermined amount of antimicrobial chemical and continues circulation. The processing module further doses antifoaming chemical in predetermined doses as desired. Further dosing of antimicrobial chemical and/or antifoaming chemical can be done at anytime, as desired (e.g., anytime the antimicrobial level is not sufficient, etc.).

Once a proper pH, conductivity, etc. and/or temperature of the washing fluid is achieved, the startup/calibration screen of the processing module leaves and a user operation screen becomes active. Any change of parameters of the washing fluid (e.g., as measured by the float switch, pH probe, thermocouple, etc.) causes a re-calibration of data for doses of water, antimicrobial chemical, antifoam chemical, cooling operation (e.g., compressor activation, notifying required addition of ice, etc.). Moreover, a re-calibration of data may be done automatically for each cleaning operation or batch of food product.

Desired food products are placed in wire baskets generally positioned above the tank on upper hanging rails. An operator indicates to the processing module (via the user operation screen) the basket location to be cleaned and the type of food products being washed and sanitized. Baskets containing the food products are then lowered into the tank containing the washing fluid on a lower hanging rail. Additional food products can be similarly prepared, programmed using the user operation screen, and cleaned. Once a wash cycle is completed for given food products (e.g., based on predetermined elapsed cleaning time, etc.), the baskets containing the cleaned food products are raised and placed back on the upper hanging rail above the tank. The cleaned food products are then rinsed, if necessary, using an outside water source (e.g., a post-rinse faucet, etc.). This can be done over the tank containing the washing fluid or over a rinsing sink. The cleaned and rinsed food products can then be removed from the baskets and processed further, for example, placed in a cool zone, sold, consumed, or displayed for sale. Because of the processing modules ability to monitor pH, conductivity, etc. levels, chemicals are automatically dosed to predetermined levels to assure dilution does not occur and efficacy is maintained.

In example embodiments, assemblies and methods of the present disclosure may utilize gasses (e.g., air, etc.) to agitate, mix, etc. washing fluid within washing chambers. For example, aeration systems, bubbling systems, etc. may be provided for introducing air into the washing fluid. In one example embodiment, an aerator, air pump, etc. may be used to introduce, inject, etc. air into washing fluid to agitate, mix, etc. the washing fluid (e.g., within a washing chamber of a tank, etc.).

Example assemblies and methods of the present disclosure may operate as part of food safety programs configured to help ensure food cleanliness and sanitation prior to distribution, consumption, etc. Such food safety programs may provide for consistent and systematic food preparation prior to consumption. Example assemblies and methods of the present disclosure may include innovative food product washing equipment and may provide procedures designed to help monitor and assure compliance with established food safety programs.

Example assemblies and methods of the present disclosure may provide injection of a food product wash agent into an agitated cold-water bath to eliminate dirt, grime, residues, waxes, and microbes and bacteria that can cause food-borne illnesses. The example assemblies and methods can thus provide important parts of the overall food safety programs to help create systematic, well thought out approaches to food preparation. Example assemblies and methods of the present disclosure may clean and sanitize food products (e.g., produce, etc.), as well as provide mechanisms to assess and/or monitor adherence of food preparation personnel to food safety programs. Example assemblies and methods may include labeling operations that can print key sanitization data and can provide statistical reporting capabilities to allow operations managers and food safety directors the ability to assess proper utilization of equipment to assure compliance with food safety programs.

Example assemblies and methods of the present disclosure may also be of a scale for use in commercial kitchen and industrial food processing environments to clean and sanitize hundreds of pounds of produce in short periods of time within a small operational footprint.

In addition, example assemblies and methods of the present disclosure can provide crisping features that include chilling washing fluid to about 45 degrees Fahrenheit. These crisping features may operate to keep cell structure perked in food products and help promote longevity, freshness, etc. of the food products. Example assemblies and methods of the present disclosure can also provide agitation features that help create surface friction on the food products to assist wash agents in cleaning and sanitizing. Example assemblies and methods of the present disclosure can also provide wash agents that can be automatically injected into washing fluids to help assure proper solution, pH, conductivity, etc. levels, etc. Example assemblies and methods of the present disclosure can also provide labeling features that can allow for printing labels with key sanitization and operating data for placement on produce, storage containers, for consumer viewing, etc. Example assemblies and methods of the present disclosure can also provide statistical reporting features that can provide management with key data to monitor compliance with food safety programs.

Example assemblies and methods of the present disclosure can also provide basketing features that allow produce of differing types to be cleaned and sanitized simultaneously and allow for smaller batches for ergonomic transfer. Example assemblies and methods of the present disclosure can also provide timer features such as alarms that indicate when food products have been sanitized for a prescribed period. Example assemblies and methods of the present disclosure can also provide fluid filtration to help reduce the amount of food particles in wash chambers. Example assemblies and methods of the present disclosure can also provide pre-rinse/final-rinse features such as spray faucets that can be used to remove visible soils and loose food particles at the pre-rinse stage and wash agent residue, if any, after cleaning and sanitization.

Example assemblies of the present disclosure may be module in structure such that they can be expanded, for example, to add dish tables, additional chambers, shelves, salad spinners, devices for extracting excess water from food products, etc.

Embodiments of the present disclosure offer various advantages over other known washing operations. For example, embodiments of the present disclosure provide automated operations to help control cleaning quality. Processing modules, for example, can help ensure proper, accurate, etc. amounts of chemicals are added to washing fluids to help ensure proper cleaning environments (e.g., recommended levels, maximum allowable levels, etc.). Moreover, the chemicals in the washing fluids can be automatically constantly and continually monitored and adjusted so that less downtime may be required for adjusting (e.g., if too little chemical is present such that cleaning efficacy is reduced, or if too much chemical is present such that a hazard exists to operators or equipment, etc.). As such, chemical levels in the washing fluid may be consistently maintained at appropriate concentrations over time to maintain effective cleaning operation. The processing module can also monitor and adjust other parameters of the washing fluid (e.g., pH, conductivity, temperature, oxidation reduction potential (ORP), conductivity, etc.) that may be indicative of levels of various active agents in the washing fluid or that may affect the effectiveness of the washing fluid.

Embodiments of the present disclosure also use chilled washing fluids for cleaning food products. As such, the food products may be less likely to wilt, wither, lose freshness, become flaccid, soften, etc. The chilled washing fluids may further provide a crisping, firming, freshening, increased hydration, etc. effect to the food products (e.g., especially for fruits and vegetables, etc.). As such, crisping of produce can be done simultaneously with the cleaning, washing, disinfecting, sanitizing, etc. thereof. This may eliminate the need for two machines or a two-step process, one for cleaning and one for crisping. Moreover, weights of some food products, including certain vegetables, may increase by an estimated five percent as a result of washing them in the chilled washing fluid.

Embodiments of the present disclosure may also provide gentle cleaning operations (e.g., via submerged fluid agitation, etc.). As such, the embodiments may help inhibit bruising, damage, etc. to food products as they are cleaned. For example, robust and tender produce may be cleaned with equal effectiveness but without damage.

Embodiments of the present disclosure also provide systematic cleaning, washing, disinfecting, sanitizing, etc. of food products, including, fruits and vegetables. In addition, washing fluid may be recycled while inhibiting risks of cross contamination from microorganisms (e.g., via filter systems, etc.). Further, embodiments provide ability to monitor and record data pertaining to, for example, performance, function, usage, parameters, settings, data, etc. And, the data may be remotely accessed, uploaded, and manipulated. The data may also be provided on labels for placement in desired areas once a food product has been properly cleaned, sanitized and/or disinfected.

Embodiments of the present disclosure also provide monitoring features for cleaning multiple batches of food products. Different types of food products can therefore be reliably cleaned at the same time.

Embodiments of the present disclosure are suitable for commercial use. And, as such, embodiments can function within space constraints often found in foodservice operations and retail (e.g., grocery, etc.) operations.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A food preparation assembly for cleaning food products, the food preparation assembly comprising:
   a tank for holding washing fluid for use in cleaning food products positioned within the tank;
   a pump in fluidic communication with the tank to provide movement of the washing fluid within the tank for use in cleaning the food products when positioned within the tank; and
   a processing module configured to receive wash cycle selections associated with cleaning the food products, a first wash cycle selection pertaining to at least one of the food products and a second wash cycle selection pertaining to at least another one of the food products, wherein the first wash cycle overlaps with the second wash cycle such that the at least one of the food products and the at least another one of the food products can be disposed in the washing fluid in the tank at the same time for cleaning.

2. The food preparation assembly of claim 1, further comprising an intake and a discharge coupled to the tank in fluidic communication with the pump, the pump operable to remove washing fluid from the tank through the intake and then introduce the removed washing fluid back into the tank through the discharge.

3. The food preparation assembly of claim 2, wherein the discharge includes a cover plate defining openings for introducing the removed washing fluid back into the tank through the discharge.

4. The food preparation assembly of claim 1, further comprising a first basket for holding the at least one of the food products and a second basket for holding the at least another one of the food products.

5. The food preparation assembly of claim 1, further comprising a printing device in communication with the processing module, the processing module configured to:
   direct the printing device to generate a first label, when the first wash cycle is complete, indicative of completion of cleaning of the at least one of the food products; and
   direct the printing device to generate a second label, when the second wash cycle is complete, indicative of completion of cleaning of the at least another one of the food products.

6. The food preparation assembly of claim 4, wherein the first basket and the second basket are each configured to releasably couple to the food preparation assembly at one or more different locations relative to the tank.

7. The food preparation assembly of claim 1, wherein the processing module is configured to associate a first basket for holding the at least one of the food products with the first wash cycle, and to associate a second basket for holding the at least another one of the food products with the second wash cycle.

8. The food preparation assembly of claim 7, wherein the processing module is configured to activate a first indicator when cleaning of the at least one of the food products in the first basket is complete, and to activate a second indicator when cleaning of the al last another one of the food products in the second basket is complete.

9. The food preparation assembly of claim 7, further comprising the first and second baskets.

10. The food preparation assembly of claim 1, wherein the processing module includes a user interface configured to receive at least one input setting corresponding to a type of food product to be cleaned.

11. The food preparation assembly of claim 1, further comprising a sensor in fluidic communication with the washing fluid for measuring a value of at least one or more parameters of the washing fluid.

12. The food preparation assembly of claim 11, further comprising a system operable to adjust the value of the at least one or more parameters of the washing fluid.

13. The food preparation assembly of claim 12, wherein the at least one or more parameters includes pH and/or conductivity, and wherein the system includes an injection device in fluidic communication with the tank for adding wash agent into the washing fluid in the tank for adjusting the pH and/or conductivity of the washing fluid.

14. The food preparation assembly of claim 12, wherein the at least one or more parameters includes temperature, and wherein the system includes an evaporator coil in communication with the tank for adjusting the temperature of the washing fluid.

15. The food preparation assembly of claim 12, wherein the processing module is in communication with the sensor and the system for operation to automatically adjust the at least one or more parameters of the washing fluid.

16. The food preparation assembly of claim 1, further comprising a rinsing chamber for rinsing the cleaned food products after being cleaned.

17. The food preparation assembly of claim 1, wherein the pump is a first pump, the assembly further comprising a second pump in fluidic communication with the tank and operable to add wash agent to the washing fluid.

18. The food preparation assembly of claim 17, wherein the processing module operates to activate the second pump to add the wash agent to the washing fluid based on a measured value of one or more parameters of the washing fluid.

19. The food preparation assembly of claim 18, further comprising a third pump in fluidic communication with the tank and operable to add antifoaming agent to the washing fluid, the processing module being operable to activate the third pump to add the antifoaming agent to the washing fluid based on a measured value of one or more parameters of the washing fluid.

20. The food preparation assembly of claim 1, further comprising:
   a cooling device for adjusting temperature of the washing fluid in the tank to a desired value, as determined by the processing module based at least partially on a measured temperature of the washing fluid; and
   an injection device for adjusting pH and/or conductivity of the washing fluid in the tank to a desired value, as determined by the processing module based at least partially on a measured pH and/or conductivity of the washing fluid.

* * * * *